(12) United States Patent
Du et al.

(10) Patent No.: US 9,706,019 B2
(45) Date of Patent: Jul. 11, 2017

(54) METHOD, SYSTEM, AND NETWORK ELEMENT FOR SERVICE PROCESSING AFTER DATA OF NETWORK ELEMENT IS INVALID OR NETWORK ELEMENT FAILS

(75) Inventors: Qian Du, Beijing (CN); Bing Wei, Beijing (CN); Xiaoyun Wang, Beijing (CN); Leibin Wang, Shenzhen (CN); Shufeng Shi, Shenzhen (CN); Peng Zhao, Shenzhen (CN); Xuexia Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 34 days.

(21) Appl. No.: 12/493,358

(22) Filed: Jun. 29, 2009

(65) Prior Publication Data

US 2010/0165833 A1    Jul. 1, 2010

Related U.S. Application Data

(63) Continuation of application No. PCT/CN2007/071332, filed on Dec. 26, 2007.

(30) Foreign Application Priority Data

Dec. 29, 2006   (CN) .......................... 2006 1 0169866
Apr. 30, 2007   (CN) .......................... 2007 1 0101579
Aug. 10, 2007   (CN) .......................... 2007 1 0135728

(51) Int. Cl.
*H04L 1/00*  (2006.01)
*H04L 29/14* (2006.01)
*H04L 29/06* (2006.01)

(52) U.S. Cl.
CPC .......... *H04L 69/40* (2013.01); *H04L 65/1016* (2013.01); *H04L 65/1073* (2013.01)

(58) Field of Classification Search
None
See application file for complete search history.

(56) References Cited

U.S. PATENT DOCUMENTS 6,678,264 B1    1/2004  Gibson
7,080,141 B1    7/2006  Baekelmans et al.
(Continued)

FOREIGN PATENT DOCUMENTS

CN    1645812 A    7/2005
CN    1756181      4/2006
(Continued)

OTHER PUBLICATIONS

"3rd Generation Partnership Project; Technical Specification Group Core Network and Terminals; IP Multimedia (IM) Subsystem Cx and Dx Interfaces; Signalling Flows and Message Contents (Release 5)" 3GPP. Sep. 2005.
(Continued)

*Primary Examiner* — Kibrom T Hailu
(74) *Attorney, Agent, or Firm* — Brinks Gilson & Lione

(57) ABSTRACT

A method, a system, and a network element for service processing after data of a network element is invalid or a network element fails are provided. When the service network element (1) receives the service request message from the network and initiated to a called end and the user data is invalid, the service network element (1) returns a data invalid message of the called end to the network. When a network element containing registration data of a user is abnormal and the registration data of the user is invalid, by using the present invention, the service unavailable time is shortened, and user services can be recovered rapidly.

4 Claims, 22 Drawing Sheets

(56) References Cited

U.S. PATENT DOCUMENTS

| | | | |
|---|---|---|---|
| 7,177,642 | B2 | 2/2007 | Sanchez Herrero et al. |
| 8,693,312 | B2 | 4/2014 | Zhu et al. |
| 2004/0184452 | A1 | 9/2004 | Huotari et al. |
| 2004/0199641 | A1* | 10/2004 | Bajko ............... H04W 76/02 709/227 |
| 2004/0242227 | A1 | 12/2004 | Huotari et al. |
| 2005/0141481 | A1* | 6/2005 | Kauppinen ............ H04W 8/12 370/352 |
| 2006/0178132 | A1 | 8/2006 | Tammi et al. |
| 2006/0206504 | A1 | 9/2006 | Cai et al. |
| 2006/0221828 | A1 | 10/2006 | Towle |
| 2006/0291486 | A1 | 12/2006 | Cai et al. |
| 2007/0275710 | A1* | 11/2007 | Mayer et al. ................ 455/423 |
| 2007/0287454 | A1 | 12/2007 | Zhu et al. |
| 2008/0274739 | A1 | 11/2008 | Wu |
| 2010/0008352 | A1 | 1/2010 | Przybysz et al. |

FOREIGN PATENT DOCUMENTS

| | | |
|---|---|---|
| CN | 1777322 A | 5/2006 |
| CN | 1852289 | 10/2006 |
| CN | 1874279 | 12/2006 |
| CN | 1878074 | 12/2006 |
| CN | 1878087 | 12/2006 |
| CN | 1885787 A | 12/2006 |
| GB | 2 411 541 B | 9/2006 |
| KR | 20040096446 | 11/2004 |
| KR | 2006033407 A | 4/2006 |
| RU | 2 273 105 C2 | 3/2006 |
| RU | 2 300 140 C2 | 5/2007 |
| RU | 2 310 284 C2 | 11/2007 |
| WO | WO 02/089448 A2 | 11/2002 |
| WO | 03/103231 A1 | 12/2003 |
| WO | WO 2004/008178 A2 | 1/2004 |
| WO | WO 2005/064978 A1 | 7/2005 |
| WO | WO 2006/047957 A1 | 5/2006 |
| WO | 2006/087291 A1 | 8/2006 |
| WO | WO 2006/089592 A1 | 8/2006 |
| WO | 2006136097 A1 | 12/2006 |

OTHER PUBLICATIONS

"3$^{rd}$ Generation Partnership Project; Technical Specification Group and System Aspects; IP Multimedia Subsystem (IMS); Stage 2 (Release 7)" 3GPP. Dec. 2005.

"Reassignment for S-CSCF During the Terminated Call Procedure" 3 GPP TSG SA WG2 Architecture. Budapest, Hungary. Jan. 16-20, 2006.

Partial English Translation of previously submitted PCT published Application No. WO2006/087291A1.

"Reassignment for S-CSF During the Terminated Call Procedure" TSG-SA Working Group 2 (Architecture), Jan. 16, 2006.

"[Draft] LS on SA2 Comments and Actions Relating to S-CSF Re-Assignment" 3$^{rd}$ Generation Partnership Project (3GPP), Mobile Partnership Project (3GPP), Mobile Competence Centre. Jan. 19, 2006.

Schulzrinne, H. et al. "SIP Session Initiation Protocol" Network Working Group. Jun. 2002.

Office Action issued in corresponding Russian Patent Application No. 2009134567/09; issued Mar. 2, 2010.

Office Action issued in corresponding Russian Patent Application No. 2009134567/09; issued May 11, 2010.

Office Action issued in corresponding Russian Patent Application No. 2009129157/09; issued May 5, 2010.

European Search Report issued in corresponding European Patent Application No. 09 16 5871; issued Dec. 30, 2009.

Written Opinion of the International Searching Authority issued in corresponding PCT Application No. PCT/CN2007/071332; mailed Apr. 10, 2008.

Office Action issued in corresponding Russian Patent Application No. 2009129157/09.

"Digital cellular telecommunications system (Phase 2+); Universal Mobile Telecommunications System (UMTS); IP Multimedia (1M) Subsystem Cx and Dx Interfaces; Signalling flows and message contents (3GPP TS 29.228 version 7.3.0 Release 7); ETSI TS 129 228" vol. 3-CN4, No. V7.3.0, Sep. 1, 2006 (Sep. 1, 2006); 60 pages.

France Telecom et al: "User Profile Data Synchronisation" 3GPP Draft; C4-061677, 3rd Generation Partnership Project (3GPP), Nov. 2006 (Nov. 6, 2006); 4 pages.

Office Action issued in corresponding Chinese Patent Application No. 200710135728.5, mailed Dec. 25, 2009.

Office Action issued in corresponding Chinese Patent Application No. 200710135728.5, mailed Jun. 29, 2010.

Office Action issued in corresponding Chinese Patent Application No. 200710101579.0, mailed Oct. 13, 2010.

Office Action issued in corresponding Chinese Patent Application No. 200710135728.5 , mailed Nov. 12, 2010.

Office Action issued in corresponding Russian Patent Application No. 2009129157, mailed Sep. 8, 2010.

Notification of Re-Examination issued in corresponding Chinese Patent Application No. 200710135728.5; mailed Jun. 5, 2012.

Office Action issued in corresponding Chinese Patent Application No. 200710135728.5, mailed Dec. 7, 2012.

Office Action issued in commonly owned U.S. Appl. No. 12/504,166, mailed Feb. 7, 2013.

Office Action issued in commonly owned U.S. Appl. No. 12/504,166, mailed Feb. 18, 2011.

Office Action issued in commonly owned U.S. Appl. No. 12/504,166, mailed Jul. 12, 2011.

Office Action issued in commonly owned U.S. Appl. No. 12/504,166, mailed Jul. 3, 2012.

Bannister, Jeffrey et al., *Convergence Technologies for 3G Networks*, IP UMTS, EGPRS, and ATM, John Wiley & Sons, Ltd., 2004, 673 pages.

Decision on Grant dated Feb. 2, 2011 for corresponding Russian Patent Application No. 2009134567, 14 pages.

Decision on Grant dated Feb. 22, 2011 for corresponding Russian Patent Application No. 2009129157, 13 pages.

Global System for Mobile Communications, "3$^{rd}$ Generation Partnership Project; Technical Specification Group Core Network and Terminals; IP Multimedia Call Control Protocol Based on Session Initiation Protocol (SIP) and Session Description Protocol (SDP); Stage 3 (Release 7)," 3GPP TS 24.229, V7.6.0, Dec. 2006, 401 pages.

Goldshtein B.S. et al., Protocol SIP, BHV—Saint Petersburg, 2005.

Roach, A. B., "Session Initiation Protocol (SIP)—Specific Event Notification," printed from the internet at <http://www.ietf.org/rfc/rfc3265.txt>, on Dec. 1, 2014, Standards Track, RFC 3265, The Internet Society, Jun. 2002, 34 pages.

* cited by examiner

METHOD, SYSTEM, AND NETWORK ELEMENT FOR SERVICE PROCESSING AFTER DATA OF NETWORK ELEMENT IS INVALID OR NETWORK ELEMENT FAILS

CROSS-REFERENCE TO RELATED APPLICATIONS

This application is a continuation of International Patent Application No. PCT/CN2007/071332, filed on Dec. 26, 2007, which claims priority to Chinese Patent Application Nos. 200610169866.0, filed on Dec. 29, 2006, 200710101579.0, filed on Apr. 30, 2007 and 200710135728.5, filed on Aug. 10, 2007. The contents of the above identified applications are incorporated herein by reference in their entireties.

FIELD OF THE TECHNOLOGY

The present invention relates to a method for service processing in the field of communication technology, and more particularly to a method for service processing after data of a network element is invalid and a method for service processing after a network element fails in an IP multimedia subsystem network. The present invention also relates to a service processing system and a network element, and the present invention further relates to a method, a system, and a device for returning user data, and more particularly to a method, a system, and a device for returning user data after data of a network element is invalid in an IP multimedia subsystem network.

BACKGROUND

The IP multimedia subsystem (IMS) is a subsystem overlaid above an existing packet switched (PS) domain in a Wideband Code Division Multiple Access (WCDMA) network added in the $3^{rd}$ Generation Partnership Project (3GPP) R5, and uses the PS domain as the bearer channel for the upper layer control signaling and media transmission. The Session Initiation Protocol (SIP) is introduced as the service control protocol. Taking advantage of the features that the SIP is simple, easy to be extended, and convenient for media combination, the IMS provides various multimedia services through the separation of the service control and the bearer control. The functional entities in the IMS include a call session control function (CSCF) configured to perform user registration control and service control, a home subscriber server (HSS) configured to collectively manage user subscription data, an application server (AS) configured to provide various service logic control functions, etc.

FIG. 1 is a schematic view of the network structure of the IMS network in the prior art. In FIG. 1, AS is an application server, HSS is a home subscriber server, I-CSCF is an interrogating CSCF, P-CSCF is a proxy-CSCF, S-CSCF is a serving CSCF, and UE is user equipment. As shown in FIG. 1, a service process of a user is as follows: after the UE is started, the UE initiates a registration process to the IMS network; after receiving a registration request from the user, the IMS network saves information such as registration data and registration state of the user in the corresponding network elements, for example, the P-CSCF, S-CSCF, AS, and HSS all store the registration information of the user. The UE carries a registration period parameter in a registration message, and after the UE is registered successfully, the UE periodically initiates a re-registration process to the IMS network to update the registration data and registration state of the user. Only the user in the registered state on the corresponding network element in the IMS network can perform the corresponding user service, such as, initiate a call as a calling party or receive a call as a called party.

FIG. 2 is a flow chart of a service performing process of a user in the IMS network described in the 3GPP standards in the prior art. As shown in FIG. 2, the process includes the following steps.

In Step 201, after the UE is started, the UE sends a Register message to the P-CSCF.

In Step 202, after storing relevant data of the user locally, the P-CSCF forwards the Register message to the I-CSCF in a home domain of the user.

In Step 203, the I-CSCF sends a User-Authorization-Request (UAR) to the HSS, and queries the S-CSCF that can provide the service to the user.

In Step 204, the HSS returns a User-Authorization-Answer (UAA) carrying the S-CSCF that can provide the service to the user to the I-CSCF.

In Step 205, the I-CSCF forwards the Register message to the selected S-CSCF.

In Step 206, the S-CSCF sends a Server-Assignment-Request (SAR) to the HSS, and requests subscription data of the user from the HSS.

In Step 207, the HSS returns a Server-Assignment-Answer (SAA) carrying the subscription data of the user to the S-CSCF.

In Step 208, the S-CSCF initiates a third-party registration to the corresponding AS according to the subscription data of the user, and stores relevant data of the user locally.

In Step 209, the AS responds with a registration success response.

In Step 210, the S-CSCF responds with a registration success response.

In Step 211, the I-CSCF responds with a registration success response.

In Step 212, the P-CSCF responds with a registration success response.

In Step 213, after the user is registered successfully, the user may start to perform the corresponding service process.

In Step 214, after the UE registration period expires, the UE initiates a re-registration process to update the registration data and registration state of the user in the IMS network, so that the user can continue to perform the service process.

In the prior art, the UE initiates the registration request to the IMS network, and after the registration succeeds, the UE does not initiate the re-registration process in the registration period initiatively. If one of the network elements (for example, the P-CSCF, S-CSCF, or AS) storing the registration data of the user in the IMS network fails in this period, the registration data of the user on the network element will become invalid (for example, the registration data of the user is lost after one of the network elements is reset). At this time, if the UE initiates the service request, the network element will regard the UE as an unregistered one, and will reject the service request of the user. Therefore, the UE cannot perform a calling service in the registration period. In addition, when the user is called, as the registration data of the user on different network elements is different (some network elements store the registration data of the user, and the user is in the registered state, while other network elements do not store the registration data of the user), the called user cannot be located. Therefore, the corresponding called service cannot be performed either.

In conclusion, in the IMS network, if the registration data of the user becomes invalid because the network element storing the registration data of the user is abnormal, the user cannot perform the corresponding services in a registration period. In the existing standards, no mechanism for notifying the UE to initiate the re-registration under this situation is available.

In addition, in the prior art, if a network element fails, no corresponding service processing method is available to terminate the current service process, so the network service will remain in a stalled state, and the network service of the user cannot be recovered in time.

FIG. 3 is a detailed schematic structural view of the IMS network in the prior art. As shown in FIG. 3, the IMS network includes a CSCF and an HSS.

The CSCF provides a core control function in a core network, and is responsible for performing the registration authentication and session control of the UE, implementing the basic session routing functions for calling and called IMS users, routing and triggering value added services to the AS, and performing service control interaction when conditions are satisfied according to the IMS filtering rules subscribed to by the user.

The HSS is configured to store IMS subscription information set when an operator opens an account, and supports customization and modification of subscription data by the operator or end user through an interface with the service management system. The HSS registers the S-CSCF domain name routing information in the IMS registration process through a Cx interface based on the Diameter protocol between the HSS and the S-CSCF, and supports downloading the basic IMS subscription information to the S-CSCF through the Cx interface. The HSS selects the S-CSCF serving the user during the user registration through the Cx interface based on the Diameter protocol between the HSS and the I-CSCF, or provides the name of the S-CSCF providing service to the user currently to the I-CSCF, so that the I-CSCF can route the registration information or session to the correct S-CSCF. The HSS provides subscription data and a remote database access interface for service logic scripts to a value added service SIP AS or a Service Capability Server (SCS) in Open Service Architecture (OSA) through an Sh interface between the HSS and the SIP and between the HSS and the AS, and the HSS is responsible for transparent storage of AS value added service data of specific subscribers, but does not involve semantic interpretation.

The Subscription Location Function (SLF) is a user subscription location function, which has an address resolution mechanism. When a network operator places multiple independent and addressable HSSs, the mechanism enables the I-CSCF, S-CSCF, and the AS to find the address of the HSS where the subscription data for specific user identities is stored. The SLF may be collocated with the HSS physically.

The AS obtains or updates data related to services of the user and user state information through the Sh interface of the HSS, and the S-CSCF obtains subscription information of the user through the Cx interface between the HSS and S-CSCF.

In the IMS network, the UE can use the services provided by the IMS network after registration in the network. Meanwhile, the UE may select to subscribe to unregistered services, and when the UE is not registered in the network, the network can still provide unregistered services such as call forwarding and call recording. When the UE is registered in the network or when the user is a party of a terminating call, the S-CSCF and the HSS exchange authentication data and service data of the user through a Server-Assignment-Request/Server-Assignment-Answer (SAR/SAA) command pair.

The application scenario of the SAR/SAA is that the S-CSCF receives a registration request of the UE sent from the P-CSCF or receives a session establishment request INVITE message from the I-CSCF.

(1) The S-CSCF performs the following operation on the HSS through the SAR command:

assigning an S-CSCF to a public identity, or clearing a name of an S-CSCF assigned to one or multiple public identities;

requesting for downloading user information, including user data or charging information; and changing a registration state of a public user (PU) identity related to the user.

Server Assignment Type has 11 values, and two of which are explained as follows.

NO_ASSIGNMENT(0) is configured to request user data from the HSS by the S-CSCF, without affecting the registration state of the user.

UNREGISTERED_USER(3) is configured to indicate the S-CSCF that an INVITE request for a terminating call to an unregistered user is received.

If the name of the S-CSCF in the SAR received by the HSS is inconsistent with the name of the S-CSCF stored in the HSS, the HSS does replace the original name of the S-CSCF with the new one, but returns an Experimental-Result-Code of DIAMETER_ERROR_IDENTITY_ALREADY_REGISTERED, indicating that the S-CSCF has been assigned to the user.

When the operation type in the SAR received by the HSS is an operation that is not allowed for the user in the current state, for example, when Server Assignment Type is UNREGISTERED_USER, it indicates that the S-CSCF receives an INVITE request for a terminating call to an unregistered IMS public user identity (IMPU). However, if the IMPU is registered in the HSS, at this time, the HSS returns an Experimental-Result-Code of DIAMETER_ERROR_IN_ASSIGNMENT_TYPE, indicating that the S-CSCF has been assigned to the user, and the current state of the user is that the operation is not allowed.

(2) The HSS returns to the S-CSCF through an SAA command the following:

processing result;

user data;

charging information; and all IMS multimedia private user identities (IMPIs) of IMS subscription.

The HSS can download the user data and charging function address only when the operation type is NO_ASSIGNMENT, REGISTRATION, RE_REGISTRATION, or UNREGISTERED_USER.

Then, the process that the user initiates a terminating call or originating call, or the AS replaces the user to initiate an originating call service in the IMS network in the prior art will be described below.

FIG. 4 is a schematic view of the implementing process for a terminating call session that is not registered in the network of a user in the prior art. As shown in FIG. 4, the process includes the following steps.

In Step 4001, the I-CSCF receives an INVITE message for a terminating call to a certain user.

In Step 4002, the I-CSCF initiates a Location-Info-Request (LIR) message to obtain information about the S-CSCF serving the user or a capability set of the required S-CSCFs.

In Step 4003, if the HSS records the name of the S-CSCF serving the user, the HSS returns the name of the S-CSCF to the I-CSCF through a Location-Info-Answer message, and if the HSS does not have the record, the HSS returns the capability set of the S-CSCFs that meets the service requirements of the user.

In Step 4004, if the HSS does not return the name of the S-CSCF, but returns the capability set of the S-CSCF, the I-CSCF selects an appropriate S-CSCF according to the capability set of the S-CSCFs returned by the HSS.

In Step 4005, the I-CSCF forwards the INVITE request to the S-CSCF.

In Step 4006, if the S-CSCF does not have user data, the S-CSCF sends an SAR to the HSS to request the user data, and the Server Assignment Type parameter in the SAR command is set to UNREGISTERED_USER, so as to inform the HSS that the current state of the user is an unregistered terminating call.

In Step 4007, the HSS downloads the user data to the S-CSCF through an SAA.

In Step 4008, the S-CSCF performs service control according to the user data, and carries out subsequent processing.

FIG. 5 is a schematic view of the implementing process for a terminating call session that is registered in a network of a user in the prior art. Unlike the method shown in FIG. 4, the process shown in FIG. 5 does not include Step 4004, Step 4006, and Step 4007, because the user has been registered in the network, the network has assigned the S-CSCF serving the user, and the HSS stores the name of the S-CSCF; therefore, the process that the I-CSCF selects the S-CSCF according to the capability set of the S-CSCFs in Step 4004 will not occur here. In addition, the S-CSCF has downloaded the user data from the HSS when the user is registered, so the process that the S-CSCF downloads the user data from the HSS through the SAR/SAA in Step 4006 will not occur here either. Further, normally, the user state recorded in the HSS is registered, and the name of the related S-CSCF is stored in the HSS, so the situation that the S-CSCF does not have the user data will not occur, and Step 4007 does not need to be performed here.

FIG. 6 is a schematic view of the implementing process that the AS replaces the user to initiate an originating call session in the prior art. As shown in FIG. 6, when the AS replaces the user to initiate the originating call, the AS may obtain the name of the S-CSCF serving the user from the HSS through a third-party registration or through an Sh interface. If the AS obtains the name of the S-CSCF serving the user before replacing the user to initiate the originating call, Step 601a in FIG. 6 is performed, that is, the AS directly routes the session to the S-CSCF serving the user. If the name of the S-CSCF serving the user cannot be obtained, Step 601b1 needs to be performed.

In Step 601b1, the session is routed to the I-CSCF of the home domain of the user.

In Step 601b2, the I-CSCF initiates an LIR message to the HSS, fills a calling user identity in a P-Asserted-Identity header field of the message to the LIR, and adds an originating call request flag to query information about the current location of the user, that is, information about the S-CSCF serving the user.

In Step 601b3, the HSS queries information corresponding to the user in a database according to the user identity in the LIR, and returns the name of the S-CSCF serving the user or a capability set of the S-CSCFs to the I-CSCF through an LIA.

In Step 601b4, if the HSS returns the capability set of the S-CSCFs, the I-CSCF needs to select the S-CSCF according to the capability set.

In Step 601b5, the I-CSCF routes the INVITE message to the S-CSCF returned by the HSS, or to the S-CSCF selected for the user according to the capability set of the S-CSCFs returned by the HSS.

In Step 602, if the S-CSCF does not have information about the user, the S-CSCF carries the user identity in the P-Asserted-Identity header field in an SAR, so as to request the subscription data of the user from the HSS, and if the S-CSCF has the information about the user, Step 604 is performed directly.

In Step 603, the HSS returns the requested subscription data of the user to the S-CSCF through an SAA.

In Step 644, the S-CSCF performs the service control.

In Step 605, the S-CSCF carries out subsequent processing.

FIG. 7 is a schematic view of the implementing process that the user initiates an originating call session in the prior art. As shown in FIG. 7, the process includes the following steps.

In Step 701, the UE initiates an INVITE message, and may optionally fill a Public User Identity indicating the identity of the UE in a P-Preferred-Identity header field.

In Step 702, after receiving the INVITE message, the P-CSCF checks whether the message contains the P-Preferred-Identity header field, and checks whether the value of the header field matches a registered Public User Identity recorded in the P-CSCF, and if the value of the header field matches a registered Public User Identity recorded in the P-CSCF, the P-CSCF uses the Public User Identity as the initiator of the session, and fills the Public User Identity in the P-Asserted-Identity; if no matching registered Public User Identity is found, or the P-Preferred-Identity header field does not exist, the P-CSCF selects a default Public User Identity as the initiator of the session for the user, and fills the Public User Identity in the P-Asserted-Identity.

In Step 703, after receiving the INVITE message, the S-CSCF triggers services according to the identity of the calling user in the P-Asserted-Identity header field in the message, and routes the subsequent session according to the Request-URI (that is, the called user) in the INVITE message.

After careful analysis of the above processes, it can be seen that, in normal situations, that is, when the user state recorded in the HSS is registered and the name of the related S-CSCF is stored, the S-CSCF always has the user data. However, when the IMPU of a user is lost because of sudden abnormity of the S-CSCF that the user registers, for example, in the case of system breakdown and reboot, if the UE of the user does not register in this process, the subscription information of the user in the HSS is not updated, and the registered user is still recorded as being registered on the original S-CSCF.

At this time, when the S-CSCF receives the session request INVITE message sent by the I-CSCF or the AS, as the S-CSCF does not have the corresponding user data, the S-CSCF sends an SAR to the HSS to request for the user data, and the Server Assignment Type parameter in the SAR command is filled as UNREGISTERED_USER. However, the HSS finds that the S-CSCF initiating the SAR and the S-CSCF recorded in the HSS are the same, but the state of the IMPU of the user requesting for operation is registered in the HSS. At this time, the HSS will not return the service information of the user in the SAA, but set Experiment-Result-Code as DIAMETER_ERROR_IN_ASSIGN- MENT_TYPE and return it to the S-CSCF, indicating that the S-CSCF has been assigned to the user, and the current registered state does not allow the operation type. That is, the HSS informs the S-CSCF that the IMPU is in the registered state in the HSS, so the unregistered operation is not allowed. The S-CSCF returns a failure response to the I-CSCF, and the session fails.

When the S-CSCF receives the originating call request INVITE message sent from the P-CSCF, and the S-SCCF does not have the user data of the IMPU contained in the P-Asserted-Identity because of the reboot, the S-CSCF will directly return a failure to the P-CSCF, and the session fails.

Therefore, in the prior art, in the case of system breakdown or similar events of the S-CSCF, if the IMPU registered in the S-CSCF is not re-registered, the S-CSCF cannot provide the terminating call, originating call initiated by the UE, or originating call initiated by the AS on behalf of the user to the user corresponding to the IMPU.

SUMMARY

In one aspect, the present invention overcomes defects of the prior art. According to embodiments of the present invention, when a network element containing subscription data of a user in an IMS network is abnormal, and the subscription data of the user becomes invalid, corresponding services of the user can be recovered rapidly, or data invalid information can be sent, so that the network is not in an unresponsive state to ensure normal services.

In another aspect, the present invention provides a method for service processing after a network element fails, which recovers network services of a user in time when the network element fails.

In still another aspect, the present invention provides a method and a system for returning user data, an HSS, and an S-CSCF, which solve the problems that a user cannot use any terminating call, a user cannot use an originating call initiated by a UE, or the AS cannot initiate an originating call on behalf of the user before re-registration of the user when IMPU related data of the user on an S-CSCF with which the user registers is lost in the prior art.

Accordingly, in an embodiment, the present invention provides a method for service processing after data of a network element is invalid. The method includes the following steps.

When a calling end sends a service request message to a service network element in a network, and data of a calling user stored in the service network element is invalid, the service network element sends a data invalid message to the calling end.

The data invalid message carries information for triggering re-registration of the calling end.

The service network element sends a triggering message for the re-registration to the calling end at the same time as sending the data invalid message. After receiving the data invalid message and the triggering message, the calling end initiates an operation for recovering the user data to the service network element.

The operation for recovering the user data initiated by the calling end is described as follows.

The calling end initiates an operation request for re-registration to the service network element according to the data invalid message and the triggering message. The service network element performs re-registration operation for the calling end, and uses re-registered user data to update the stored user data. After the user data is recovered, the service network element carries out corresponding service processing according to the service request message.

In an embodiment, the present invention provides another method for service processing after data of a network element is invalid. The method includes the following steps.

When a service network element receives a service request message initiated by a called end in a network, and user data of the called end stored in the service network element is invalid, the service network element returns a data invalid message of the called end to the network.

After receiving the data invalid message, the network determines whether the service request can be forwarded to another network that is capable of performing communicating operations without the user data of the called end stored in the network element according to the content of the service request message, and if the service request can be forwarded to another network that is capable of performing communicating operations without the user data of the called end stored in the network element according to the content of the service request message, the service request is converted into a request message adapted to said another network, and the request message is forwarded to said another network to complete corresponding service operation; otherwise, the data invalid message is forwarded to a sending end of the service request message.

In an embodiment, the present invention further provides a service processing system after data of a network element is invalid, which includes a service request sending end, a service request receiving end, and a service network element configured in a network. The service network element includes a user data storage module and a user data comparison module, and further includes an invalid message sending module configured to send a user data invalid message to the service request sending end.

The service network element includes a triggering message sending module configured to send a re-registration message according to the user data invalid message and a re-registration module configured to recover the user data.

The network may further include a service request determining module configured to perform service determination according to the user data invalid message and the service request message sent by the service request sending end. The service request determining module is configured to determine whether the service request can be forwarded to another network that is capable of performing communicating operations without the user data stored in the user data storage module. The network further includes a service request converting module configured to forward the service request to said another network for communication.

The network further includes an invalid message forwarding module configured to forward the user data invalid message to the service request sending end.

The service request sending end and the service request receiving end may be a UE or information processing network elements in a network.

The service network element may be a P-CSCF, an I-CSCF, or an S-CSCF.

In an embodiment, the present invention further provides a method for service processing after a network element fails. The method includes the following steps.

After receiving a service request message, a previous hop network element of a failed network element returns a network element invalid message to a calling terminal sending the service request message.

In an embodiment, the present invention further provides a network element for service processing after a network element fails. The network element includes a service request message receiving module and a network element invalid message sending module.

The service request message receiving module is configured to receive a service request message.

The network element invalid message sending module is configured to return a network element invalid message to a calling terminal sending the service request message when a next hop network element of a current network element fails.

In an embodiment, the present invention further provides a method for returning user data. The method includes the following steps.

An HSS receives a user data request message from an S-CSCF, and the request message contains a user identity.

The HSS queries an S-CSCF assigned to a user according to the user identity.

When the assigned S-CSCF is the requesting S-CSCF, the HSS returns the user data according to the request message.

The method for returning user data further comprises:

querying, by the HSS, a stored registration state of the user according to the user identity; and returning, by the HSS, the user data according to the request message when the stored registration state of the user is registered and the assigned S-CSCF is the requesting S-CSCF.

The method for returning user data further comprises:

receiving, by the S-CSCF, a call request message containing the user identity; and adding, by the S-CSCF, the user identity to the user data request message, and sending the user data request message to the HSS.

In the method or returning user data, the call request message is an unregistered terminating call request INVITE message sent by an inquiry call session control function (I-CSCF) or an originating call request INVITE message initiated by an application server (AS); or an originating call request INVITE message sent by a proxy call session control function (P-CSCF) and initiated by a user equipment (UE).

The method for returning user data further comprises:

sending, by the S-CSCF, the user data request message to the HSS after adding the user identity to the user data request message when the S-CSCF cannot find the user data according to the user identity.

The method for returning user data further comprises:

performing, by the S-CSCF, service control according to the returned user data.

In an embodiment, the present invention further provides a system for returning user data. The system includes an S-CSCF and an HSS, and further includes a first receiving module, a query module, a first determining module, and a feedback module.

The first receiving module is configured to receive a user data request message sent to the HSS by the S-CSCF, in which the request message contains a user identity.

The query module is configured to query an S-CSCF assigned to a user according to the user identity.

The first determining module is configured to determine whether the S-CSCF assigned to the user by the query module is the requesting S-CSCF, and trigger the feedback module when the assigned S-CSCF is the requesting S-CSCF.

The feedback module is configured to return the user data according to the request message.

The query module is further configured to query a registration state of the user according to the user identity; and the first determining module is further configured to trigger the feedback module to return the user data according to the request message when the stored registration state of the user is registered and the assigned S-CSCF is the requesting S-CSCF.

The system for returning user data further comprises a first adding module configured to add the user identity to the user data request message after the S-CSCF receives a call request message containing the user identity, wherein the S-CSCF sends the user data request message to the HSS.

The system for returning user data further comprises a second determining module configured to determine whether the S-CSCF can find the user data according to the user identity, and send the user data request message to the HSS when the user data cannot be found according to the user identity after triggering the first adding module to add the user identity to the user data request message.

In an embodiment, the present invention further provides an HSS. The HSS includes a first receiving module, a query module, a first determining module, and a feedback module.

The first receiving module is configured to receive a user data request message sent by an S-CSCF, in which the request message contains a user identity.

The query module is configured to query an S-CSCF assigned to a user according to the user identity.

The first determining module is configured to determine whether the S-CSCF assigned to the user by the query module is the requesting S-CSCF, and trigger the feedback module when the assigned S-CSCF is the requesting S-CSCF.

The feedback module is configured to return the user data according to the request message.

The S-CSCF further comprises:

a second determining module, configured to determine whether the S-CSCF can find the user data according to the user identity, and trigger the first adding module to add the user identity to the user data request message and send the user data request message to the HSS when the user data cannot be found according to the user identity.

In an embodiment, the present invention further provides an S-CSCF. The S-CSCF includes a first adding module.

The first adding module is configured to add a user identity to a user data request message after receiving a call request message containing the user identity. After an HSS queries an S-CSCF assigned to a user according to the user identity, the HSS determines whether the S-CSCF assigned to the user is the requesting S-CSCF, and if the S-CSCF assigned to the user is the requesting S-CSCF, user data is returned according to the request message.

In an embodiment, the present invention further provides a method for returning user data. The method includes the following steps.

An S-CSCF receives an S-CSCF system error message.

The S-CSCF receives a call request message containing a user identity.

When the S-CSCF cannot find user data according to the user identity, the S-CSCF adds the user identity and an error identifier into the user data request message, and sends the user data request message to an HSS.

After receiving the user data request message from the S-CSCF, the HSS determines that the request message contains the error identifier, and returns the user data according to the request message.

In an embodiment, the present invention further provides a system for returning user data. The system includes an S-CSCF and an HSS, and further includes a second receiving module, an error reporting module, a second determining module, a second adding module, a third determining module, and a feedback module.

The second receiving module is configured to receive a call request message sent to the S-CSCF, in which the request message contains a user identity.

The error reporting module is configured to trigger the second determining module after receiving an S-CSCF system error message.

The second determining module is configured to determine whether the S-CSCF can find user data according to the user identity, and trigger the second adding module when the user data cannot be found according to the user identity.

The second adding module is configured to add the user identity and the error identifier to a user data request message, and send the user data request message to the HSS.

The third determining module is configured to determine whether the user data request message contains the error identifier after receiving the user data request message sent to the HSS, and trigger the feedback module when the error identifier is contained.

The feedback module is configured to return the user data according to the request message.

In an embodiment, the present invention further provides an HSS. The HSS includes a third determining module and a feedback module.

The third determining module is configured to determine whether the user data request message contains the error identifier after receiving the user data request message sent to the HSS, and trigger the feedback module when the error identifier is contained.

The feedback module is configured to return the user data according to the request message.

In an embodiment, the present invention further provides an S-CSCF. The S-CSCF includes a second receiving module, an error reporting module, a second determining module, and a second adding module.

The second receiving module is configured to receive a call request message sent to the S-CSCF, in which the request message contains a user identity.

The error reporting module is configured to trigger the second determining module after receiving an S-CSCF system error message.

The second determining module is configured to determine whether the S-CSCF can find user data according to the user identity, and trigger the second adding module when the user data cannot be found according to the user identity.

The second adding module is configured to add the user identity and the error identifier to a user data request message, and send the user data request message to an HSS. The HSS determines whether to return the user data according to the request message according to whether the request message contains the error identifier.

The embodiments of the present invention have the following beneficiary effects.

(1) The embodiments of the present invention overcome defects in the 3GPP standards. When a network element (such as P-CSCF, S-CSCF, and AS) containing registration data of a user is abnormal, and the registration data of the user on the network element becomes invalid, if a UE receives a user data invalid message after sending a service request, the UE can identify the user data invalid message, and initiate a re-registration process according to the user data invalid message. If other network elements receive the user data invalid message after sending the service request, the other network elements can identify the user data invalid message, and trigger unregistered services of the user according to the user data invalid message. Thus, the service unavailable time of the user is shortened, and the user services can be recovered rapidly. Further, through the method for service processing after the network element fails, in the case of network failure, the current service process can be stopped in time, and the calling terminal can be informed. Thus, fewer system resources of the network elements will be wasted.

(2) According to the embodiments of the present invention, when an HSS receives a user data request message containing a user identity from the S-CSCF, the HSS finds that the S-CSCF initiating the operation and the S-CSCF recorded in the HSS are the same, or determines that the request message carries an error identifier, and the state of IMPU of the user requesting for operation is stored as registered in the HSS, the HSS returns the user data according to the request message. Thus, even if the IMPU related data of the user is lost on the S-CSCF with which the user registers, the user can still use any terminating call and use an originating call originated by a UE and the AS can replace the user to initiate an originating call service before re-registration of the user.

The technical solutions of the present invention will be described in detail in the following with reference to the embodiments and the accompanying drawings.

DETAILED DESCRIPTION

Figure 1:
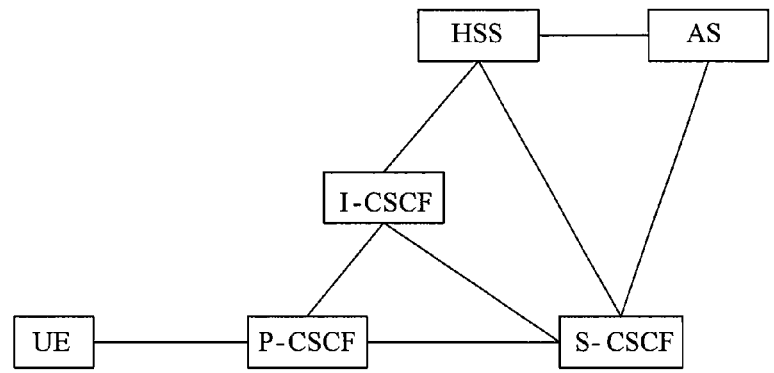
FIG. 1 is a network structure view of an IMS network in the prior art.
Figure 2:
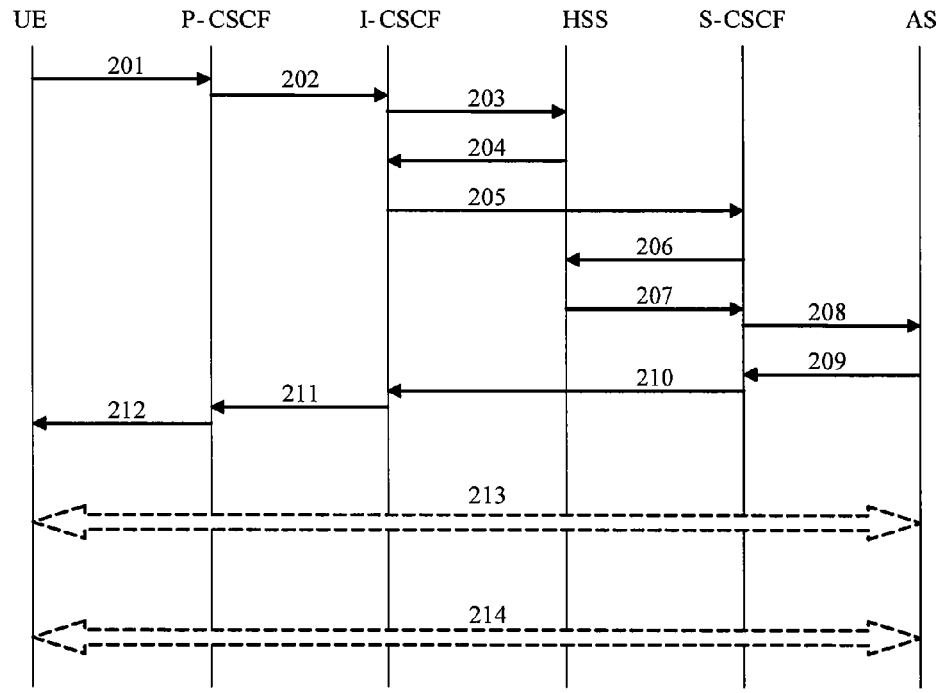
FIG. 2 is a flow chart of a service performing process of a user in the IMS network described in the 3GPP standards in the prior art.
Figure 3:
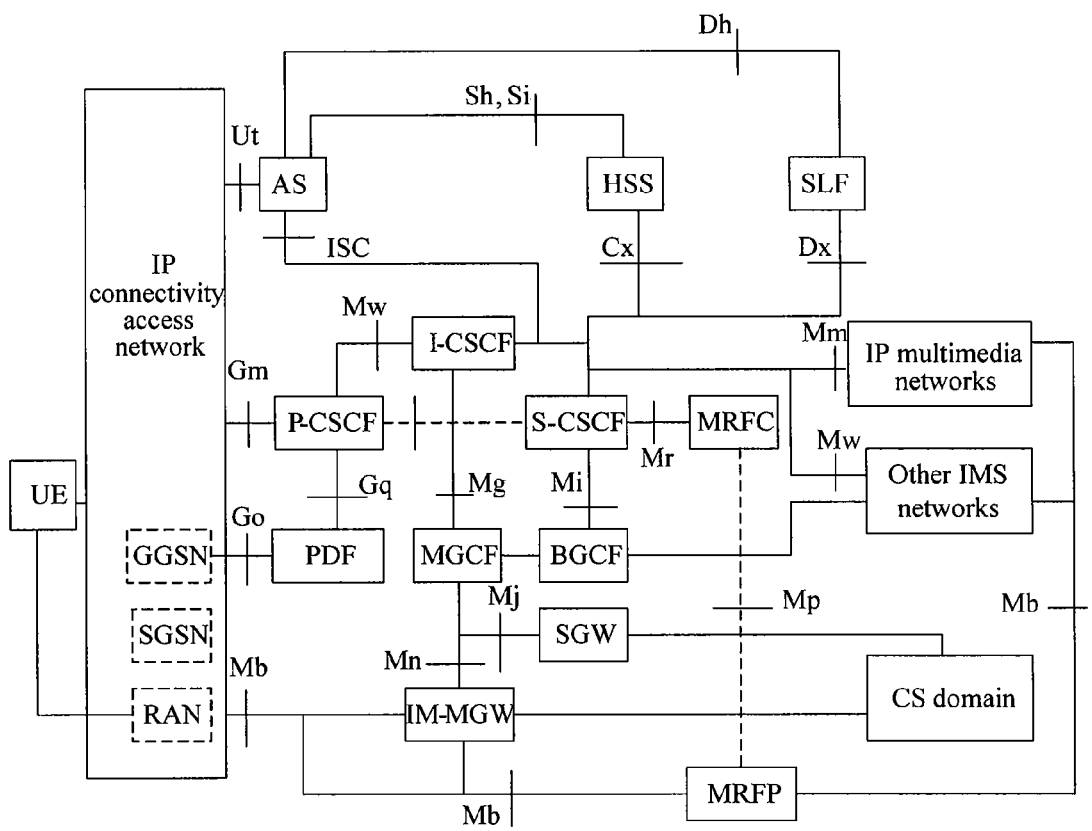
FIG. 3 is a detailed schematic structural view of the IMS network in the prior art.
Figure 4:
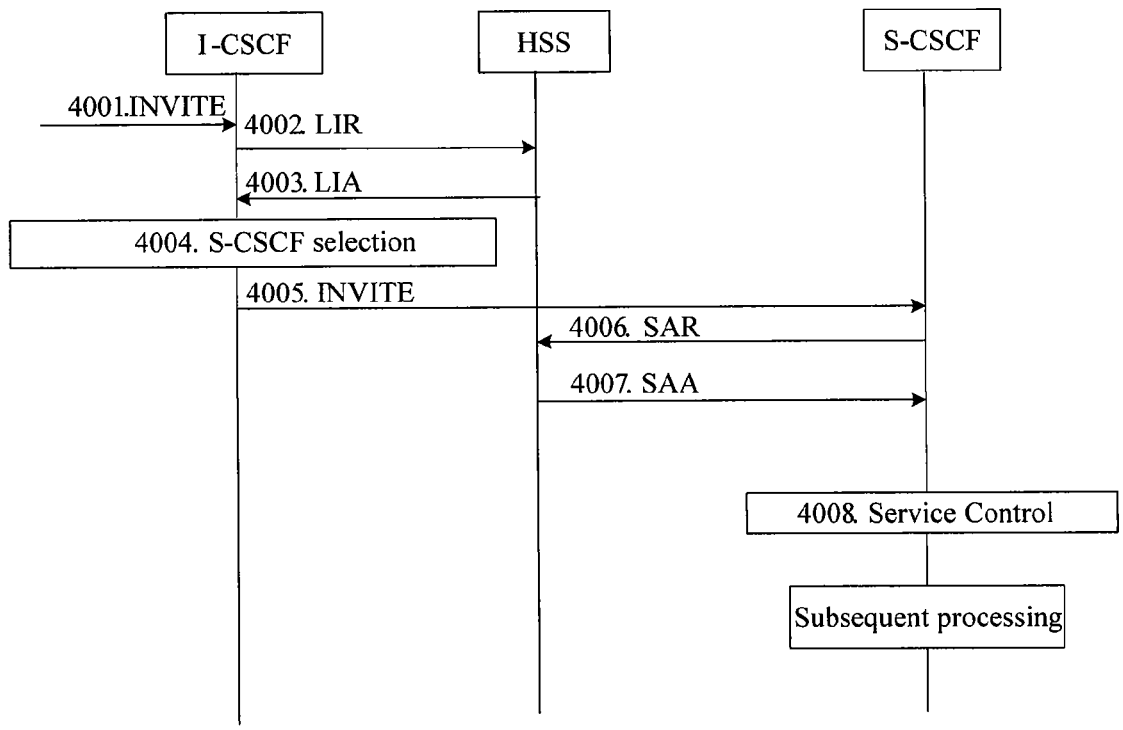
FIG. 4 is a schematic view of the implementing process for a terminating call session that is not registered in the network of a user in the prior art.
Figure 5:
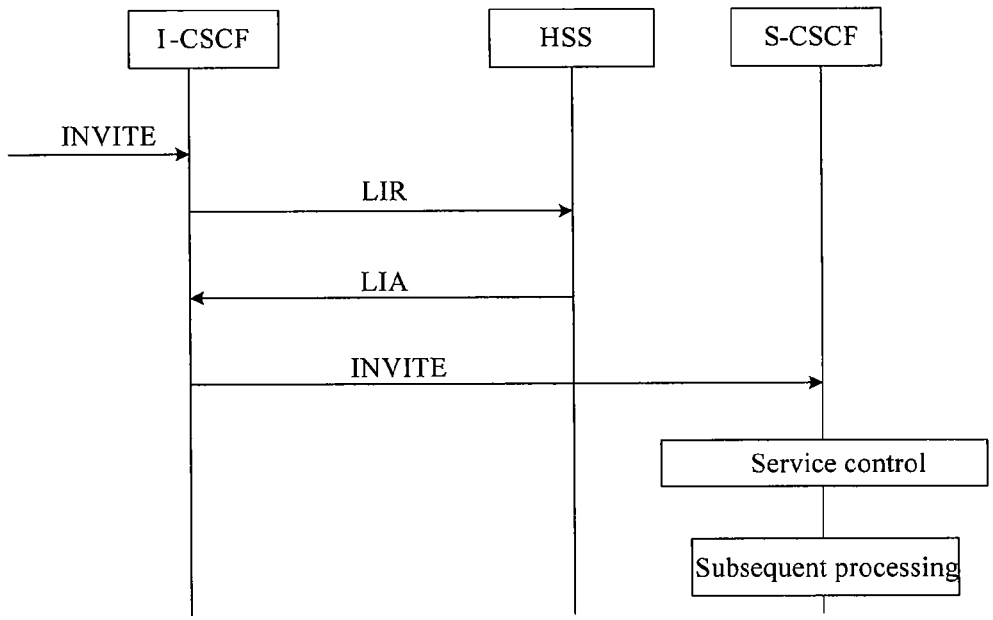
FIG. 5 is a schematic view of the implementing process for a terminating call session that is registered in the network of a user in the prior art.
Figure 6:
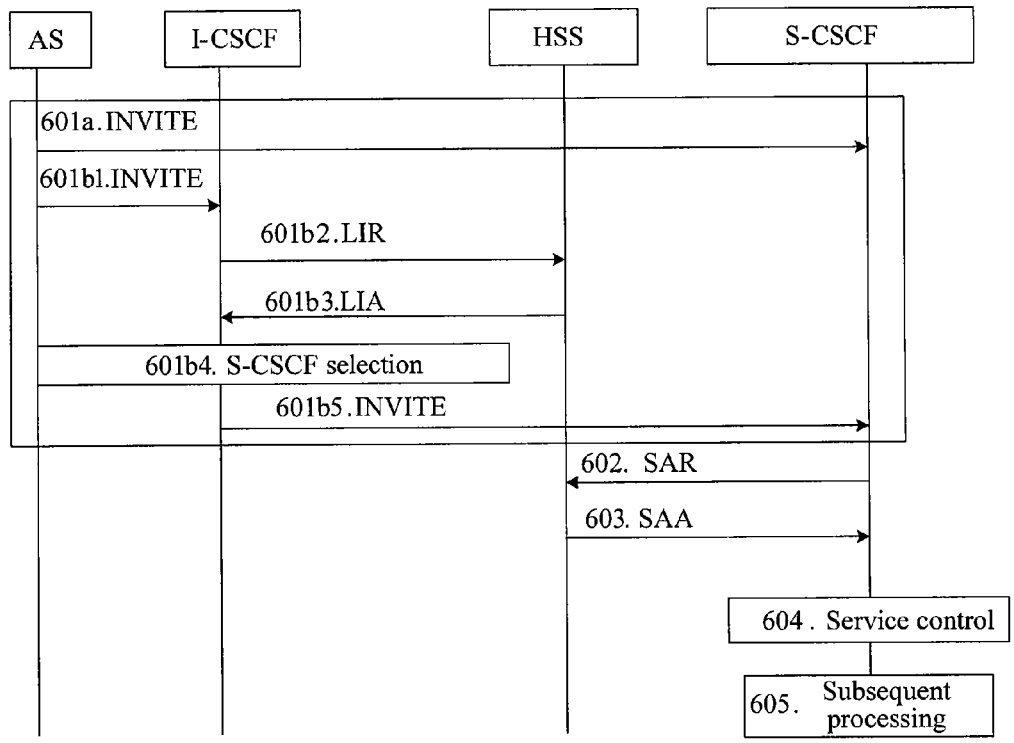
FIG. 6 is a schematic view of the implementing process that an AS replaces a user to initiate an originating call session in the prior art.
Figure 7:
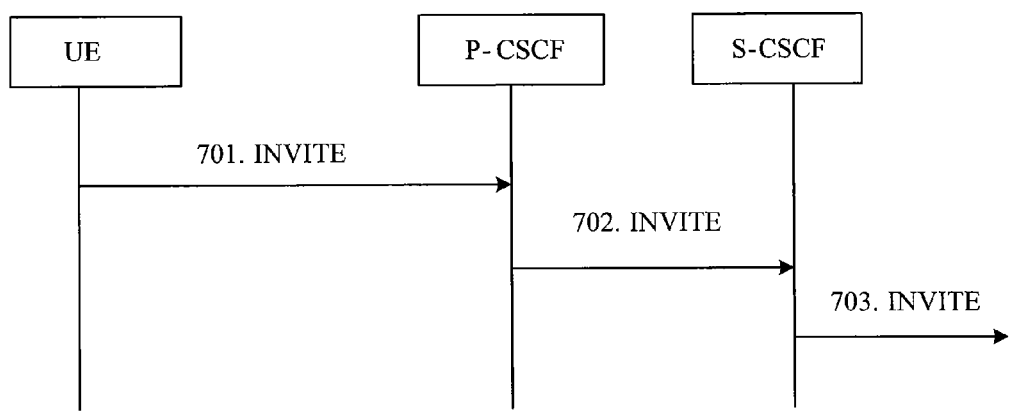
FIG. 7 is a schematic view of the implementing process that a user initiates an originating call session in the prior art.

In a first embodiment of the present invention, a method for service processing after data of a network element is invalid is as follows:

When a calling end sends a service request message to a service network element in a network, and data of calling user stored in the service network element is invalid, the service network element sends a data invalid message to the calling end. The calling end may initiate re-registration immediately, or perform re-registration when a registration period expires.

In the actual system, the calling end of the first embodiment may be a P-CSCF or a UE, and the service network element may be an S-CSCF. To ensure that the calling end can recover the normal communication services in time, in the method according to the first embodiment, the data invalid message may carry information for triggering the calling end to perform the re-registration, and thus, the calling end can perform the re-registration immediately after receiving the data invalid message. Specifically, the method according to the first embodiment may be as follows. The P-CSCF sends an originating call INVITE message to the S-CSCF, and when the S-CSCF does not contain the user data, the S-CSCF sends a data invalid message carrying information for triggering the calling end to perform re-registration to the P-CSCF.

To ensure that the calling end can recover the normal communication services in time, the method according to a second embodiment of the present invention may be adopted. The method for service processing after data of a network element is invalid according to the second embodiment of the present invention includes the following steps.

The service network element may send a triggering message for re-registration to the calling end at the same time as sending the data invalid message; the calling end does not need to initiate the re-registration after the registration period expires, and can recover the services in time. After the service network element sends the data invalid message, the calling end may initiate an operation of recovering the user data. Specifically, the operation may be as follows. The calling end initiates an operation request for re-registration to the service network element; the service network element performs re-registration operation on the calling end, and uses the re-registered user data to update the user data; and after the user data is recovered, the service network element carries out corresponding service processing according to the service request message.

In a third embodiment of the present invention, a method for service processing after data of a network element is invalid includes the following steps.

The first embodiment solves only the problem of the calling end that occurs after the data is invalid; however, as the called end and the calling end may be not in the coverage of the same service network element, the called end and the calling end are processed in different methods. When a service network element receives a service request message initiated to a called end in a network, and user data of the called end stored in the service network element is invalid, the service network element returns a data invalid message of the called end to the network.

After receiving the data invalid message, the network determines whether the service request can be forwarded to another network that is capable of performing communicating operations without the user data of the called end stored in the network element according to the content of the service request message, and if the service request can be forwarded to another network that is capable of performing communicating operations without the user data of the called end stored in the network element, the service request is converted into a request message adapted to said another network, and the request message is forwarded to said another network to complete corresponding service operation. For example, after receiving the user data invalid message, the network may trigger unregistered services of the user, and send a prompt message and a response message. The unregistered services may be forwarding the call to a voice mailbox of the user, forwarding the call to another specific user, sending a prompt ring to the calling user, and the like. If the service request cannot be forwarded to another network, the data invalid message is forwarded to a sending end of the service request message.

Figure 8:
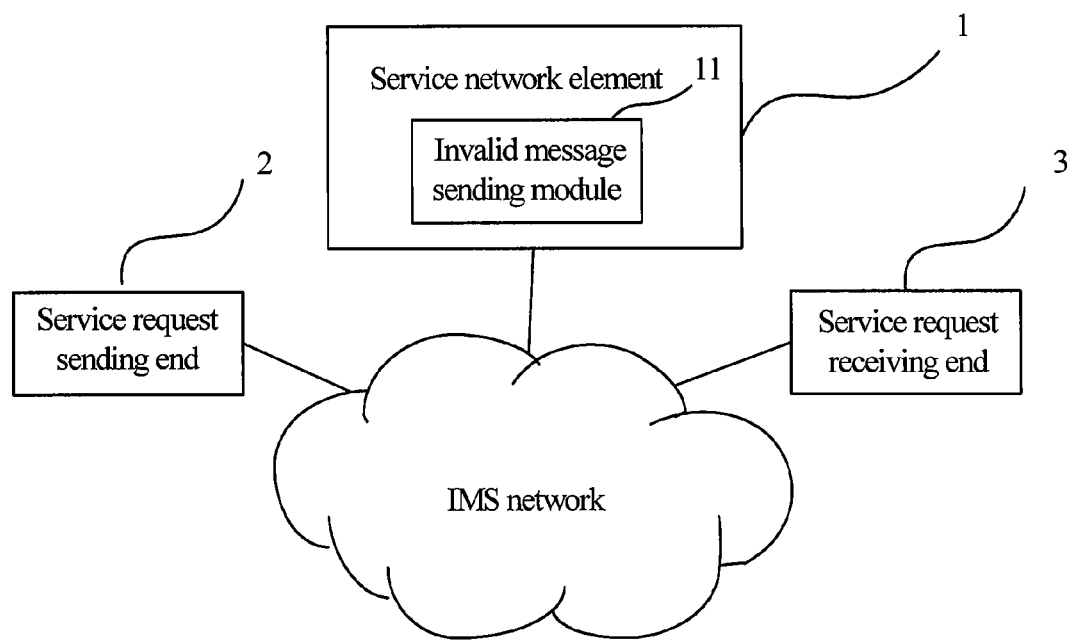
FIG. 8 is a schematic structural view of a system for service processing after data of a network element is invalid according to a first embodiment of the present invention.

FIG. 8 is a schematic structural view of a system for service processing after data of a network element is invalid according to a first embodiment of the present invention. In this embodiment, the system includes a service request sending end 2, a service request receiving end 3, and a service network element 1 configured in a network. The service network element includes a user data storage module and a user data comparison module, and further includes an invalid message sending module 11 configured to send a user data invalid message to the service request sending end.

Figure 9:
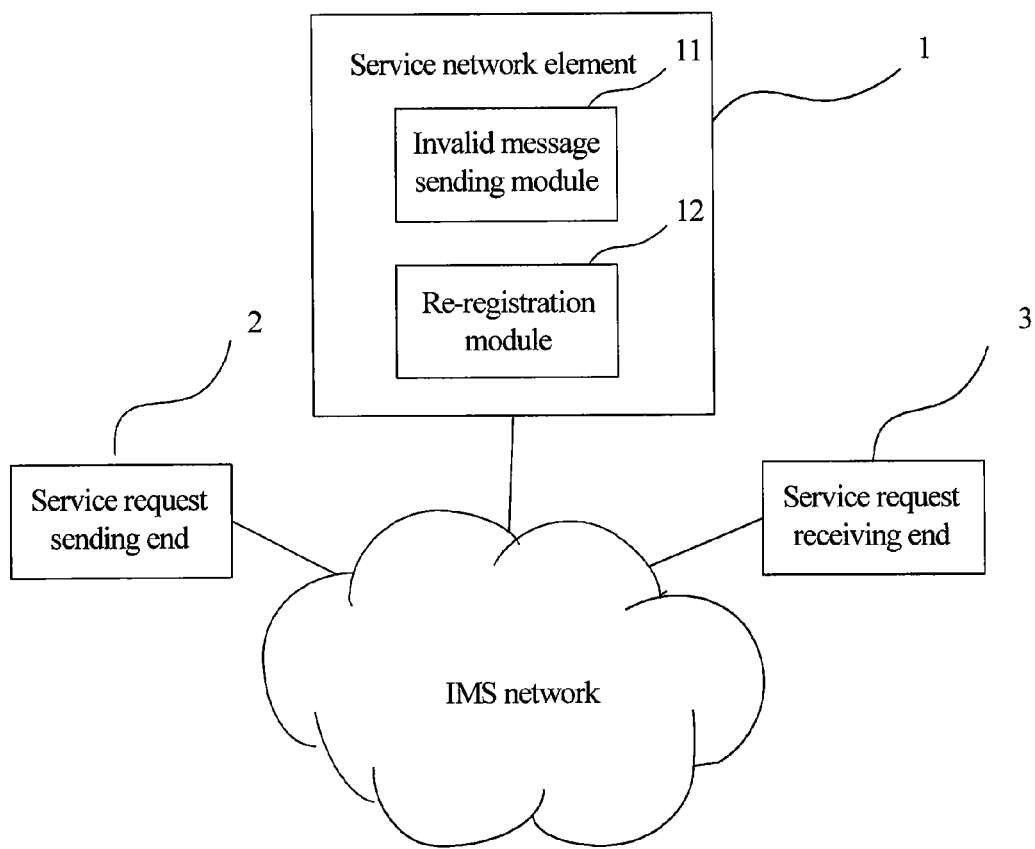
FIG. 9 is a schematic structural view of a system for service processing after data of a network element is invalid according to a second embodiment of the present invention.

FIG. 9 is a schematic structural view of a system for service processing after data of a network element is invalid according to a second embodiment of the present invention. Different from the structure of the system according to the embodiment shown in FIG. 8, the service network element shown in FIG. 9 further includes a triggering message sending module configured to send a re-registration message according to the user data invalid message and a re-registration module 12 configured to recover the user data.

Figure 10:
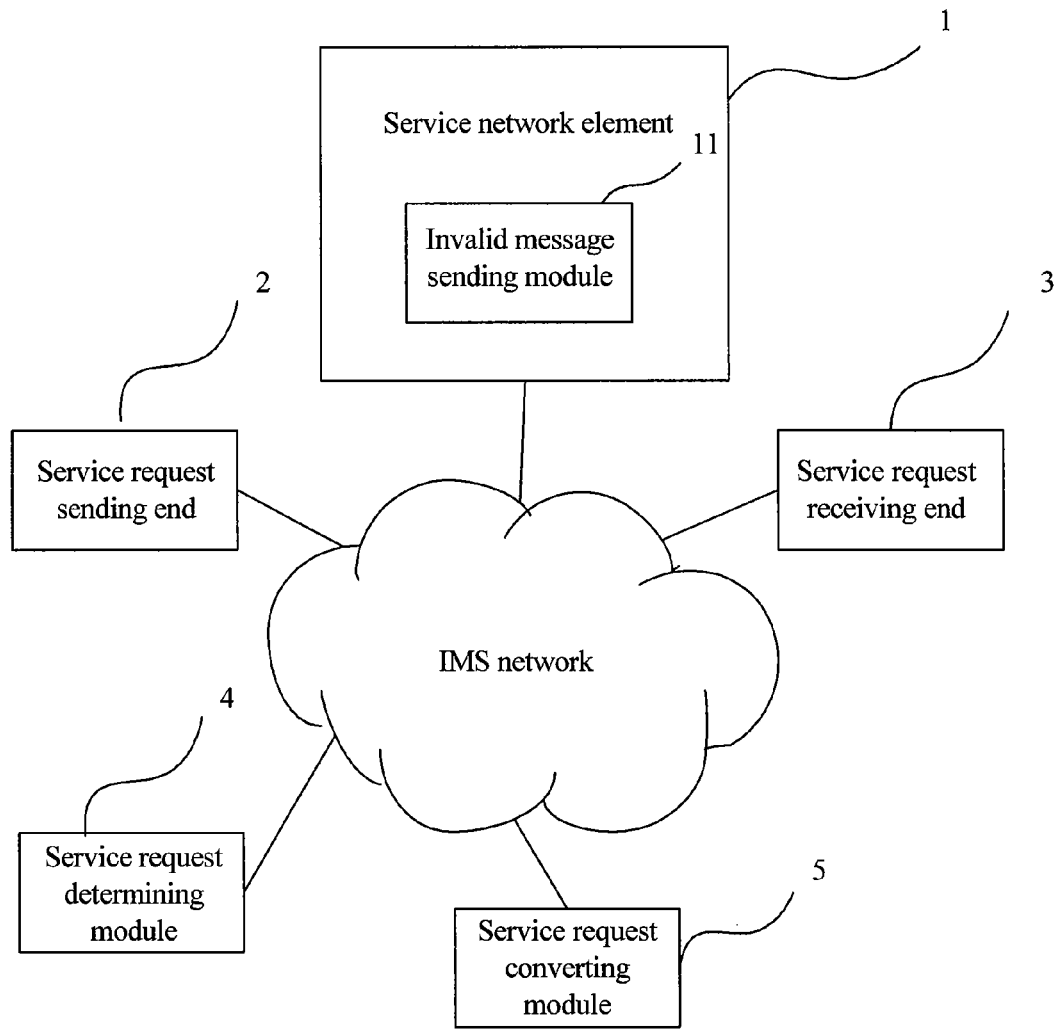
FIG. 10 is a schematic structural view of a system for service processing after data of a network element is invalid according to a third embodiment of the present invention.

FIG. 10 is a schematic structural view of a system for service processing after data of a network element is invalid according to a third embodiment of the present invention. Different from the embodiment shown in FIG. 9, in the embodiment shown in FIG. 10, the network further includes a service request determining module 4 configured to perform service determination according to the user data invalid message and the service request message sent by the service request sending end. The service request determining module is configured to determine whether the service request can be forwarded to another network that is capable of performing communicating operations without the user data stored in the user data storage module. In addition, the network further includes a service request converting module 5 configured to forward the service request to said another network for performing communication operations.

Figure 11:
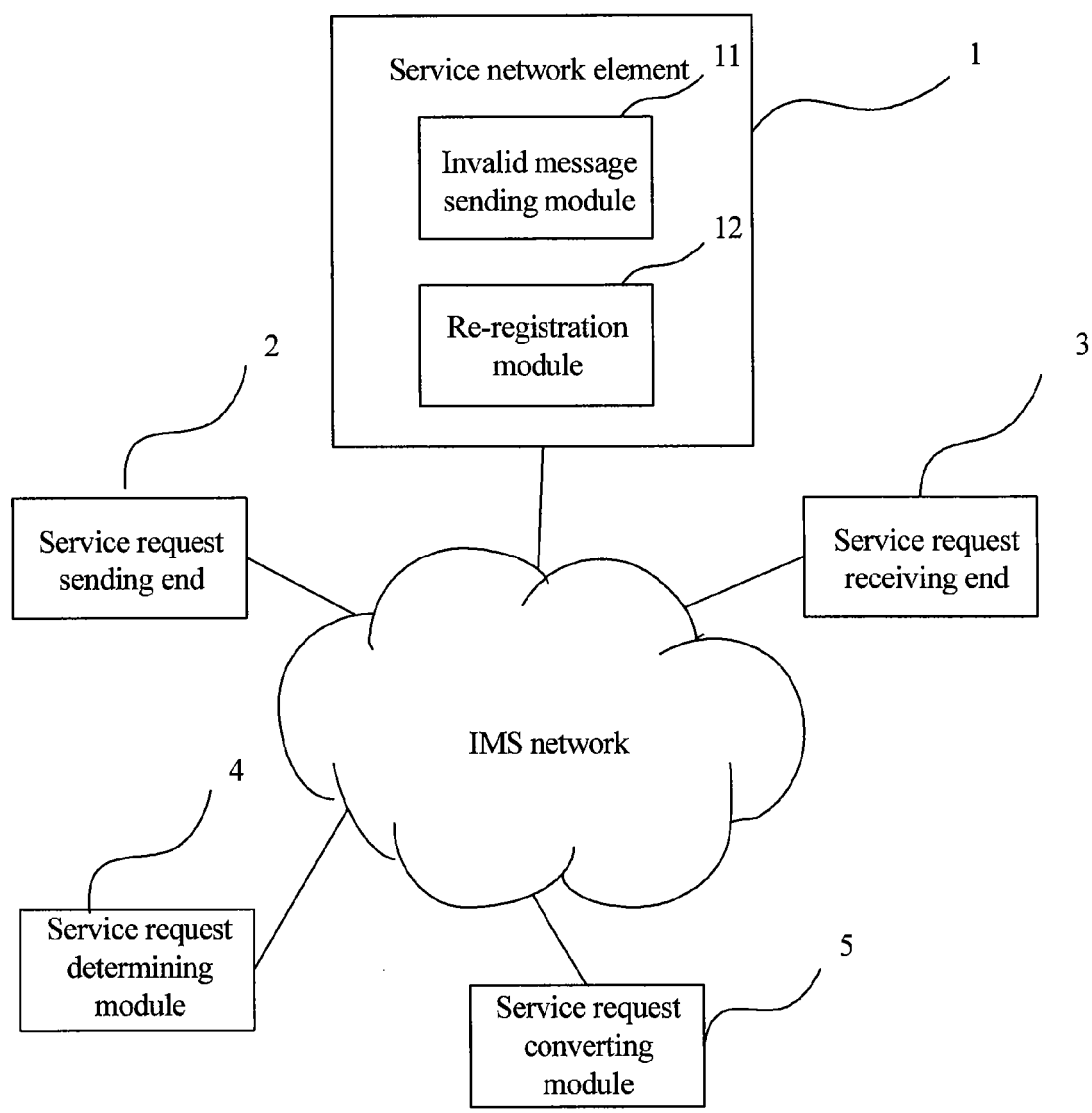
FIG. 11 is a schematic structural view of a system for service processing after data of a network element is invalid according to a fourth embodiment of the present invention.

FIG. 11 is a schematic structural view of a system for service processing after data of a network element is invalid according to a fourth embodiment of the present invention. Different from the embodiment shown in FIG. 11, in the embodiment shown in FIG. 10, the service network element further includes a triggering message sending module configured to send a re-registration message according to the user data invalid message and a re-registration module 12 configured to recover the user data.

Figure 12:
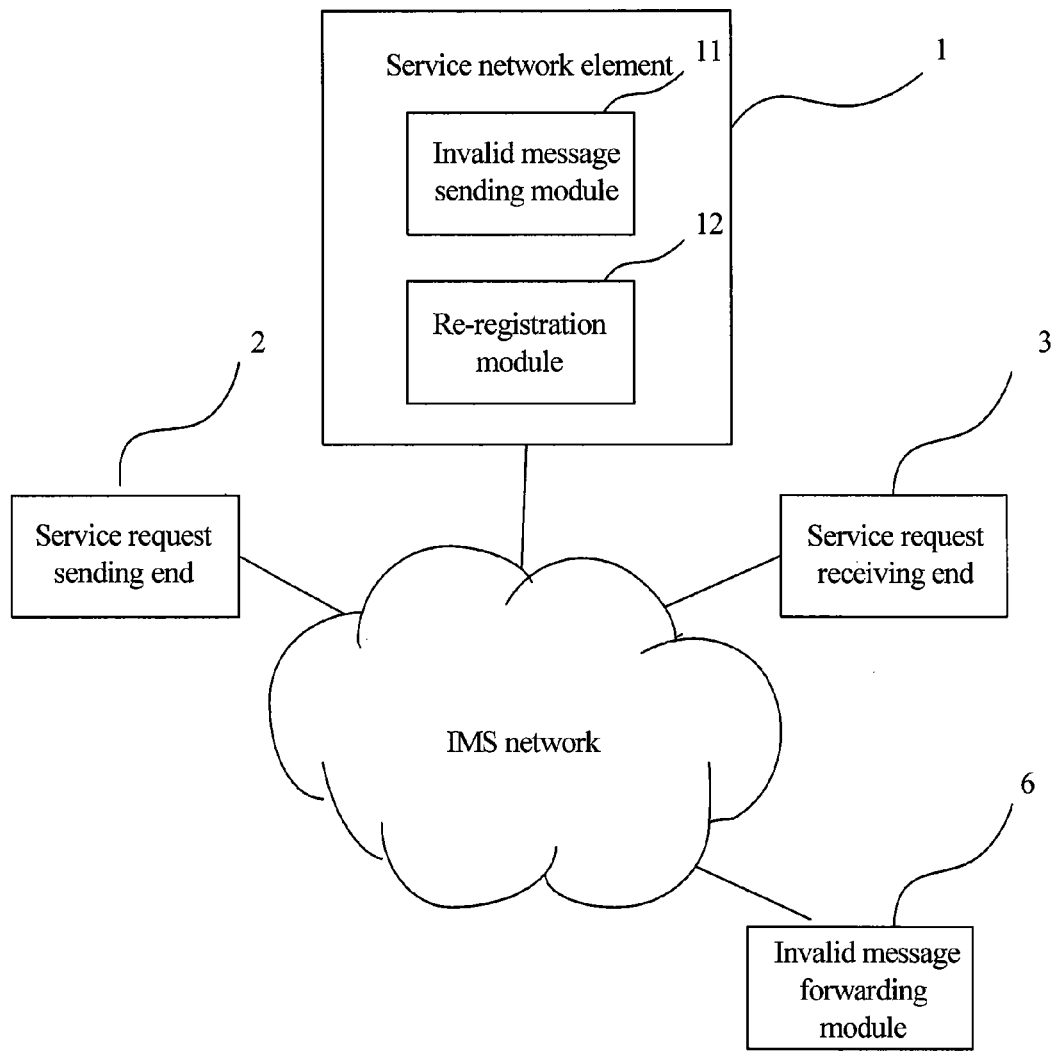
FIG. 12 is a schematic structural view of a system for service processing after data of a network element is invalid according to a fifth embodiment of the present invention.

FIG. 12 is a schematic structural view of a system for service processing after data of a network element is invalid according to a fifth embodiment of the present invention. Different from the embodiment shown in FIG. 9, in the embodiment shown in FIG. 12, the network further includes an invalid message forwarding module 6 configured to forward the user data invalid message to the service request sending end. The module is configured to inform a calling user or a network element by which the calling user is served after the data of a called user is invalid when the calling user and the called user are not in the coverage of the same network element.

In all of the above embodiments, the service request sending end and the service request receiving end may be a UE or an information processing network element in the network, for example, a CSCF or an AS. The service network element may be a P-CSCF, an I-CSCF, or an S-CSCF.

The method for service processing after a network element fails according to the present invention includes the following steps.

After receiving a service request message, a previous hop network element of the failed network element terminates a current service process, and returns a network element invalid message to a calling terminal sending the service request message.

The network element invalid message returned to the calling terminal by the previous hop network element of the failed network element may contain information for triggering re-registration of the calling terminal. After receiving the message, the calling terminal performs re-registration, so as to avoid the failed network element in new services.

For some network elements, a fault detection mechanism exists between the network elements (for example, the network elements detect whether the other element fails or not through a heartbeat function). Through the fault detection mechanism, a network element can know whether the next hop network element fails or not. Therefore, the previous hop network element of the failed network element can detect that a fault occurs on the failed network element through the fault detection mechanism.

For the network elements without the fault detection mechanism, the service processing may be as follows. After receiving the service request message, the previous hop network element of the failed network element forwards the service request to a next hop network element. If a response message from the failed network element is not received within a predetermined period of time, the current service process is terminated, and the network element invalid message is sent to the calling terminal sending the service request message. For example, when the S-CSCF fails, and a user registered with the failed S-CSCF initiates a service request, if the previous hop network element of the S-CSCF is the P-CSCF, the P-CSCF will return the invalid message to the calling terminal after receiving the service request.

Figure 13:
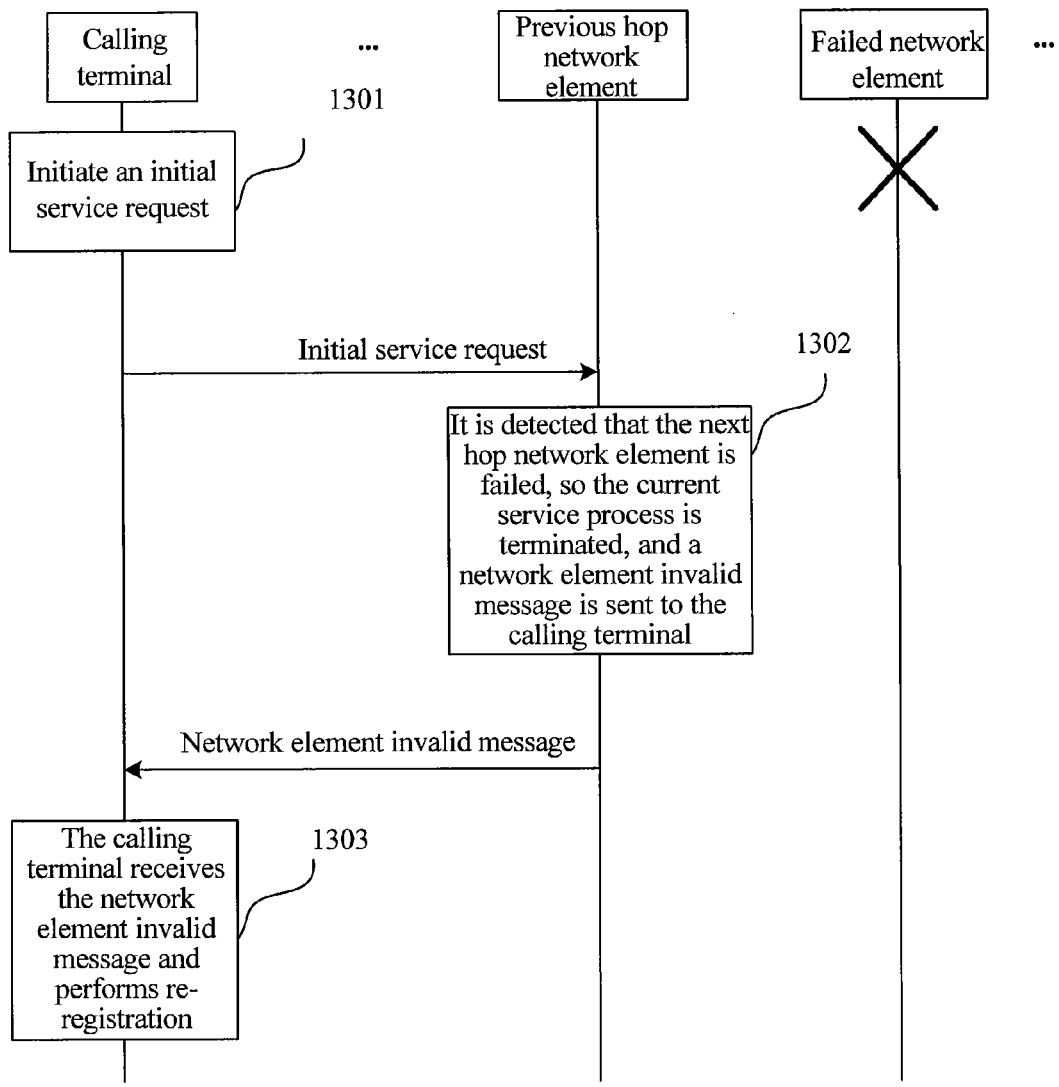
FIG. 13 is a signaling flow chart of a method for service processing after a network element fails according to a first embodiment of the present invention.

FIG. 13 is a signaling flow chart of a method for service processing after a network element fails according to a first embodiment of the present invention. The method includes the following steps.

In Step 1301, a calling terminal initiates an initial service request, and a network element can determine whether the network element itself is on a calling side according to a parameter identifier in the message.

In Step 1302, a previous hop network element of a failed network element detects that the next hop element (that is, the failed network element) fails, and terminates a current service process and returns a network element invalid message to the calling terminal sending the service request message. The previous hop network element of the failed network element determines an address of the next hop network element according to routing information in the message, and may detect a state of the next hop network element before forwarding the service request to the next hop network element.

In Step 1303, after receiving the network element invalid message, the calling terminal initiates re-registration.

Figure 14:
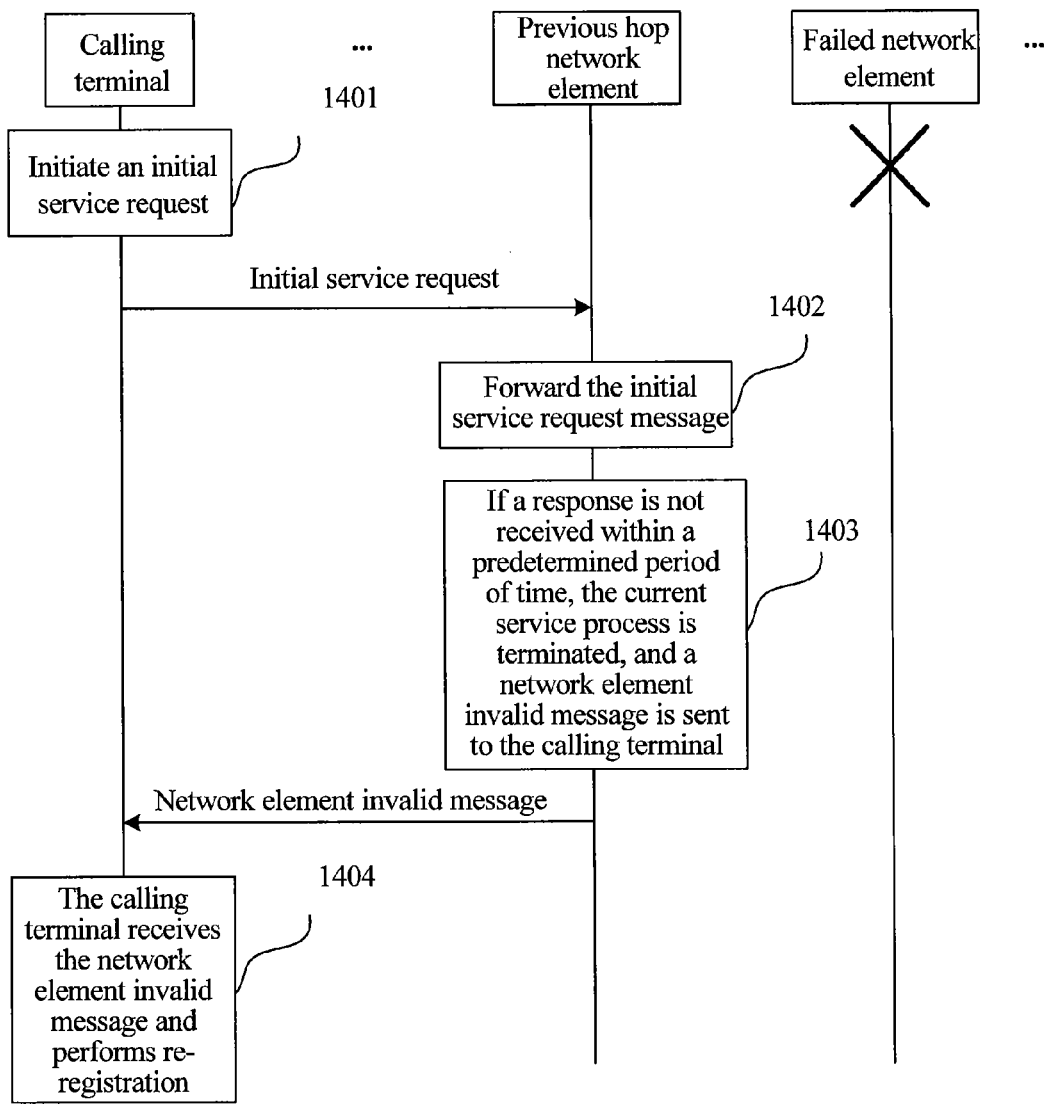
FIG. 14 is a signaling flow chart of a method for service processing after a network element fails according to a second embodiment of the present invention.

FIG. 14 is a signaling flow chart of a method for service processing after a network element fails according to a second embodiment of the present invention. The method includes the following steps.

In Step 1401, a calling terminal initiates an initial service request.

In Step 1402, a previous hop network element of a failed network element forwards the initial service request message to the next hop network element (that is, the failed network element).

In Step 1403, if a response message is not received in the predetermined period of time, the current service process is terminated, and a network element invalid message is returned to the calling terminal sending the service request message.

In Step 1404, after receiving the network element invalid message, the calling terminal initiates re-registration.

Figure 15:
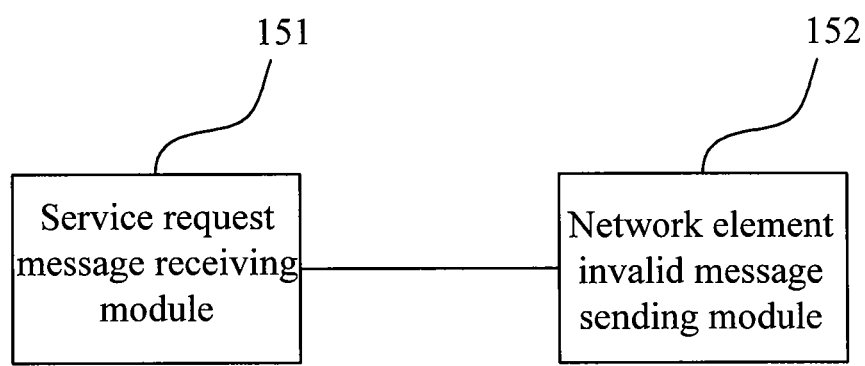
FIG. 15 is a schematic structural view of a network element for service processing after a network element fails according to a first embodiment of the present invention.

FIG. 15 is a schematic structural view of a network element for service processing after a network element fails according to a first embodiment of the present invention. The network element includes a service request message receiving module 151 and a network element invalid message sending module 152.

The service request message receiving module 151 is configured to receive a service request message.

The network element invalid message sending module 152 is configured to return a network element invalid message to a calling terminal sending the service request message when a next hop network element of the network element fails.

Figure 16:
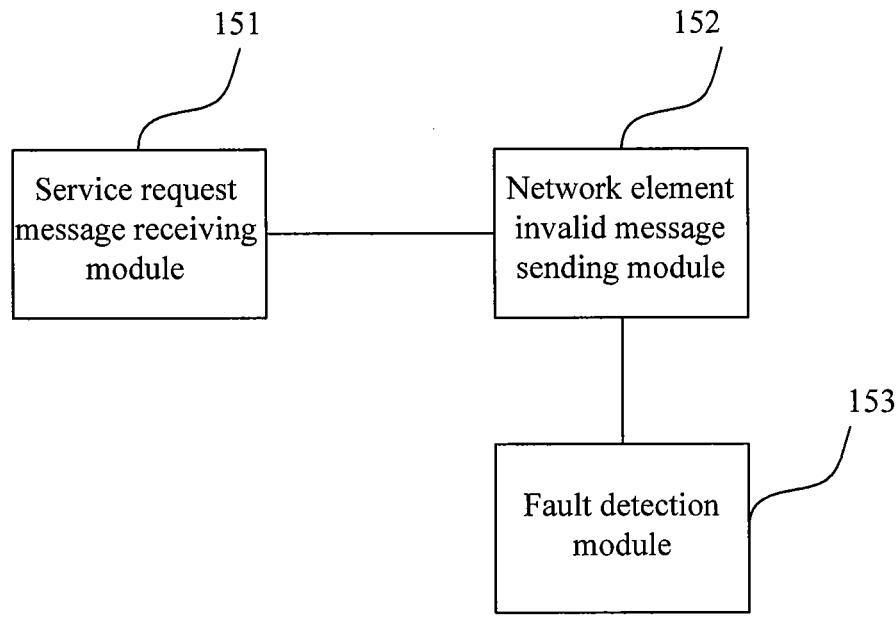
FIG. 16 is a schematic structural view of a network element for service processing after a network element fails according to a second embodiment of the present invention.

FIG. 16 is a schematic structural view of a network element for service processing after a network element fails according to a second embodiment of the present invention. Besides the components in FIG. 15, the network element further includes a fault detection module 153.

The fault detection module 153 is configured to perform fault detection on a next hop network element of the network element, and trigger the network element invalid message sending module to send a network element invalid message after detecting a fault. The service request message received by the service request message receiving module contains routing information of the next hop network element of the current network element. Therefore, the fault detection module can determine the next hop network element according to the routing information, performs the fault detection on the next hop element, and sends an instruction to trigger the network invalid message sending module to send the network element invalid message.

Figure 17:
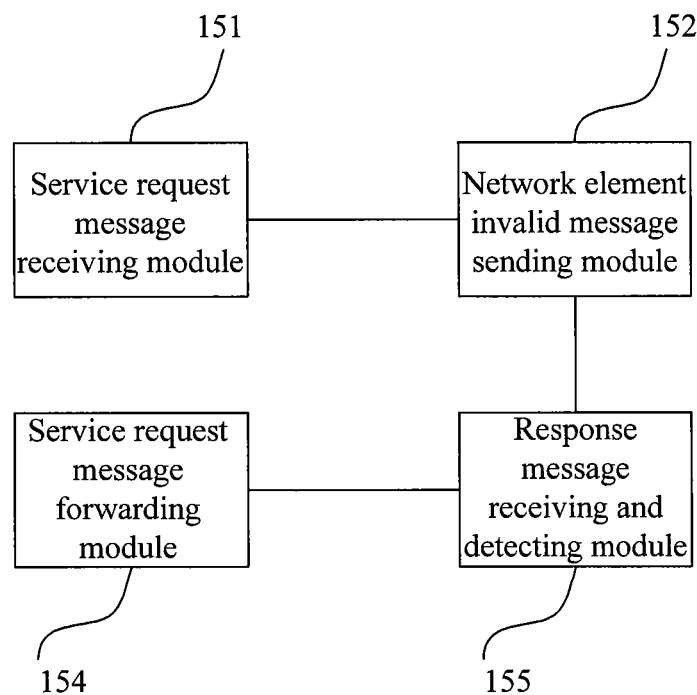
FIG. 17 is a schematic structural view of a network element for service processing after a network element fails according to a third embodiment of the present invention.

FIG. 17 is a schematic structural view of a network element for service processing after a network element fails according to a third embodiment of the present invention. Besides the components in FIG. 15, the network element further includes a service request message forwarding module 154 and a response message receiving and detecting module 155.

The service request message forwarding module 154 is configured to forward a service request message to a next hop network element of a current network element.

The response message receiving and detecting module 155 is configured to detect whether a response message is received within a predetermined period of time, and trigger the network element invalid message sending module to return a network element invalid message to a calling terminal sending the service request message if the response message returned by the next hop network element is not received. After forwarding the service request message, the service request message forwarding module triggers the response message receiving and detecting module to detect the response message. If the corresponding response message is not received within the predetermined period of time (which can be realized by setting a timer), the response message receiving and detecting module triggers the network element invalid message sending module to send the invalid message.

Figure 18:
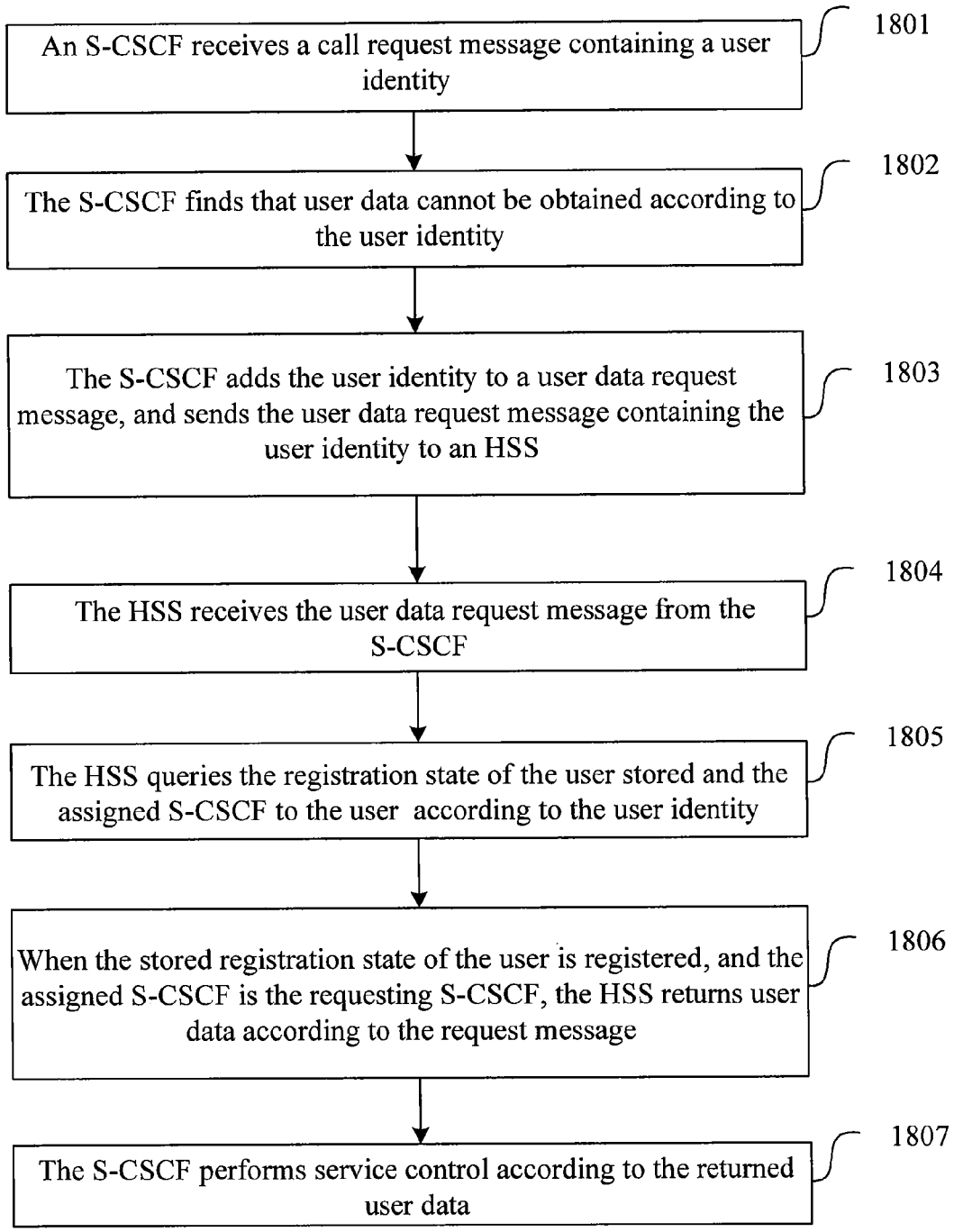
FIG. 18 is a flow chart of a method for returning user data after data of a network element is invalid according to a first embodiment of the present invention.

FIG. 18 is a flow chart of a method for returning user data after data of a network element is invalid according to a first embodiment of the present invention. The method includes the following steps.

In Step 1801, an S-CSCF receives a call request message containing a user identity.

In Step 1802, the S-CSCF found that user data cannot be obtained according to the user identity.

In Step 1803, the S-CSCF adds the user identity to a user data request message, and sends the user data request message containing the user identity to an HSS.

In Step 1804, the HSS receives the user data request message from the S-CSCF.

In Step 1805, the HSS queries the registration state of the user stored and the assigned S-CSCF to the user according to the user identity.

In Step 1806, when the stored registration state of the user is registered, and the assigned S-CSCF is the requesting S-CSCF, the HSS returns user data according to the request message.

In Step 1807, the S-CSCF performs service control according to the returned user data.

Figure 19:
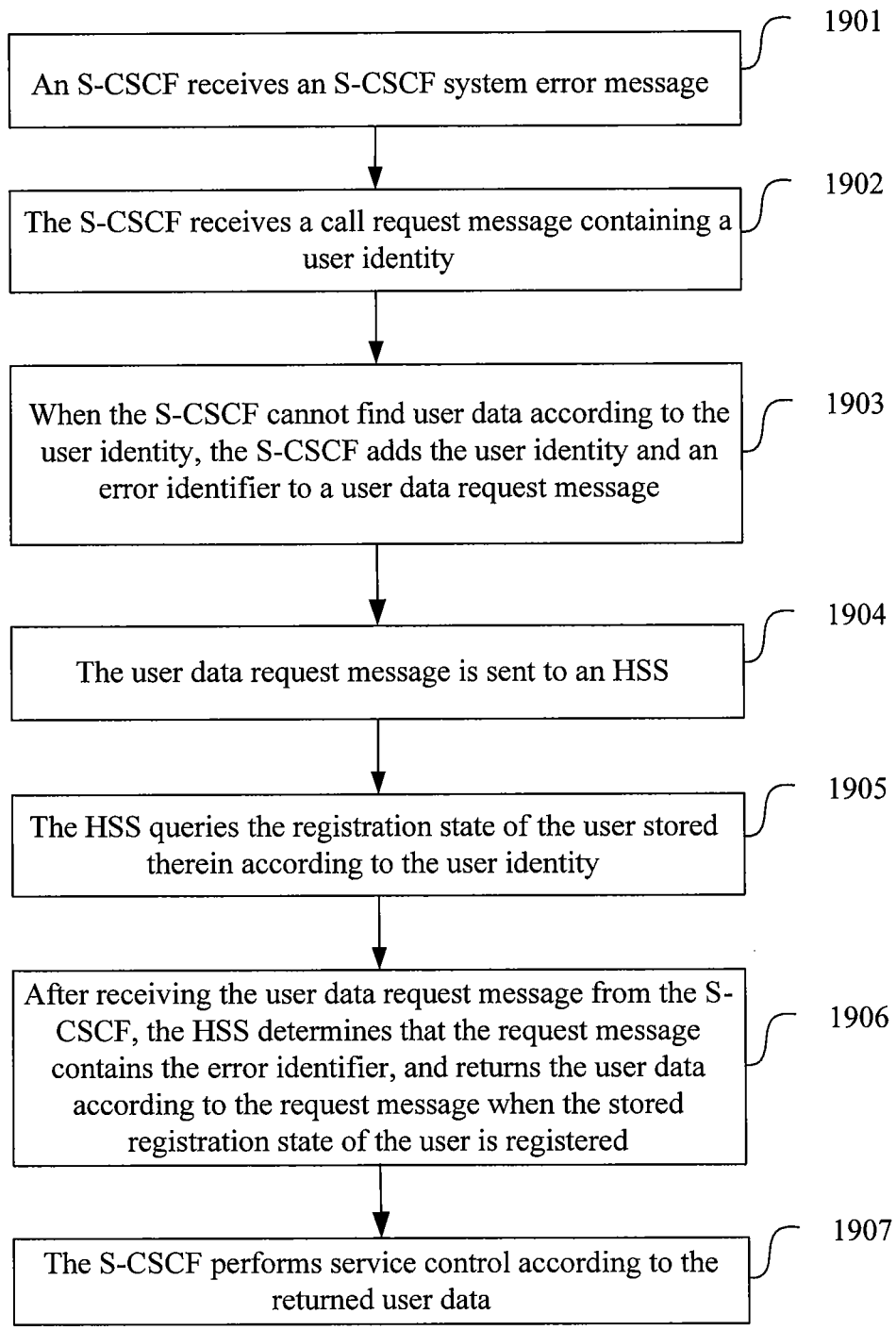
FIG. 19 is a flow chart of a method for returning user data after data of a network element is invalid according to a second embodiment of the present invention.

FIG. 19 is a flow chart of a method for returning user data after data of a network element is invalid according to a second embodiment of the present invention. The method includes the following steps.

In Step 1901, an S-CSCF receives an S-CSCF system error message.

In Step 1902, the S-CSCF receives a call request message containing a user identity.

In Step 1903, when the S-CSCF cannot find user data according to the user identity, the S-CSCF adds the user identity and an error identifier to a user data request message.

In Step 1904, the user data request message is sent to an HSS.

In Step 1905, the HSS queries the registration state of the user stored therein according to the user identity.

In Step 1906, after receiving the user data request message from the S-CSCF, the HSS determines that the request message contains the error identifier, and returns the user data according to the request message when the stored registration state of the user is registered.

In Step 1907, the S-CSCF performs service control according to the returned user data.

Figure 20:
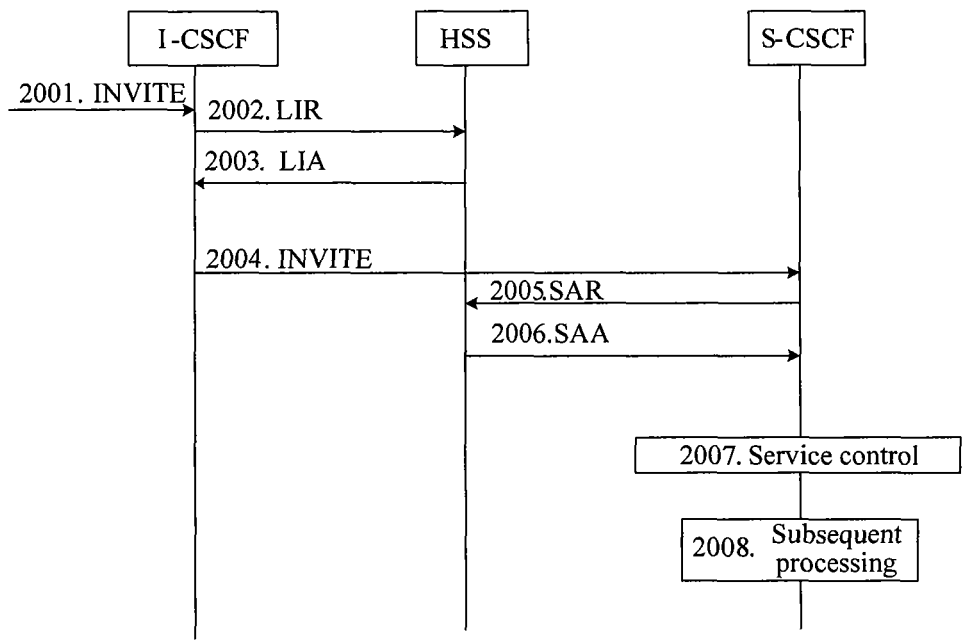
FIG. 20 is a schematic view of the implementing process that an S-CSCF receives a terminating call session request from an I-CSCF after system breakdown and reboot in a method for service processing after data of a network element is invalid according to the present invention.

FIG. 20 is a schematic view of the implementing process that an S-CSCF receives a terminating call session request from an I-CSCF after system breakdown and reboot in a method for service processing after data of a network element is invalid according to the present invention. In this embodiment, the process for returning user data when the user data is lost because of system breakdown and reboot is described. As shown in FIG. 20, the process that the S-CSCF receives the terminating call session request from the I-CSCF includes the following steps.

In Step 2001, an I-CSCF receives an INVITE message for terminating call to a user.

In Step 2002, the I-CSCF initiates an LIR message to an HSS to obtain information about the S-CSCF serving the user or the capability set of the S-CSCF required.

In Step 2003, if the registration state of the user recorded in the HSS is registered, and the HSS stores the name of the S-CSCF serving the user, the HSS returns the name of the S-CSCF to the I-CSCF through an LIA.

In Step 2004, the I-CSCF forwards the INVITE request to the S-CSCF.

In Step 2005, as the S-CSCF does not have data of the user, the S-CSCF sends an SAR to the HSS to request the user data; a Server Assignment Type parameter in the SAR command is set to UNREGISTERED_USER, so as to inform the HSS that this request is for an unregistered terminating call; in specific implementation, the S-CSCF may carry an error identifier in the SAR sent to the HSS.

In Step 2006, if the HSS finds that the state of IMPU in the SAR request stored in the HSS is registered, and the S-CSCF initiating the SAR operation and the S-CSCF recorded in the HSS are the same, the HSS downloads the user data to the S-CSCF through an SAA.

The HSS may optionally determine firstly whether the IMPU subscribes an unregistered service, and if the IMPU subscribes to an unregistered service, the HSS downloads the user data to the S-CSCF through the SAA; if the IMPU does not subscribe an unregistered service, the HSS returns an error to the S-CSCF according to the prior art.

Optionally, when the S-CSCF carries the error identifier in the SAR, the HSS may also download the user data to the S-CSCF through the SAA; otherwise, the HSS returns an error to the S-CSCF according to the prior art.

In Step 2007, the S-CSCF performs service control according to the user data.

In Step 2008, the S-CSCF carries out subsequent processing.

Figure 21:
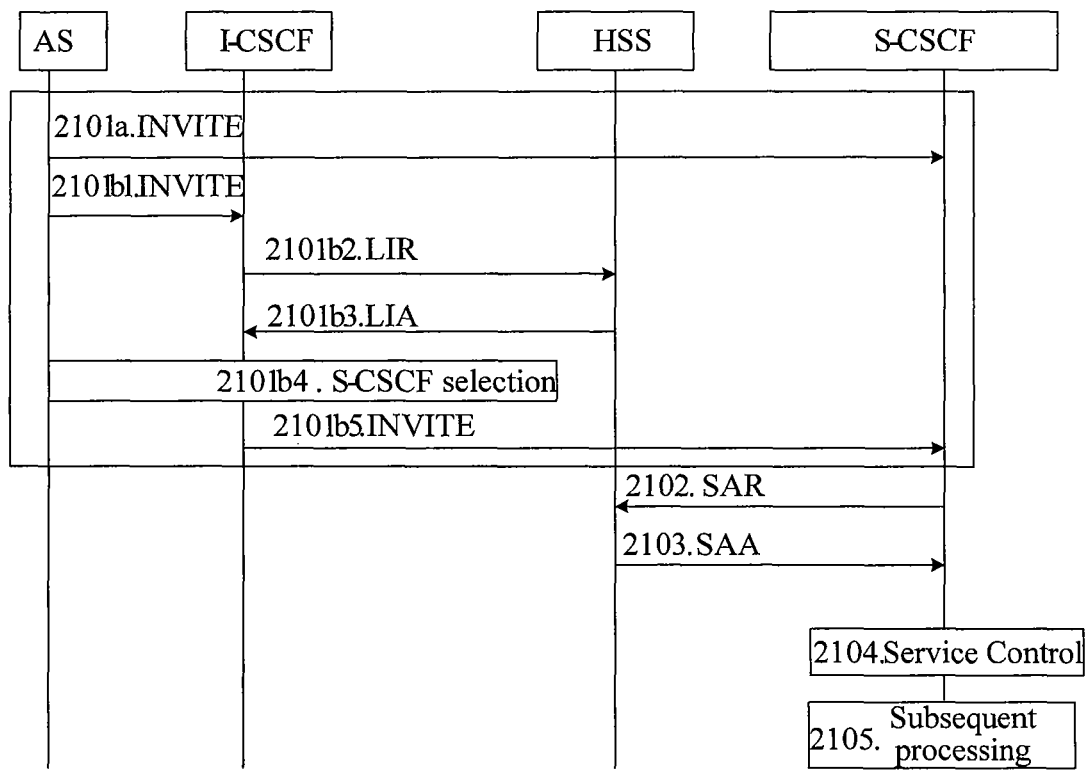
FIG. 21 is a schematic view of the implementing process that an S-CSCF receives an originating call session request from an I-CSCF or an AS after system breakdown and reboot in a method for service processing after data of a network element is invalid according to the present invention.

FIG. 21 is a schematic view of the implementing process that an S-CSCF receives an originating call session request from an I-CSCF or AS after system breakdown and reboot in a method for service processing after data of a network element is invalid according to the present invention. In this embodiment, the implementing process for returning user data when the user data is lost because of system breakdown and reboot is described. As shown in FIG. 21, the process that the S-CSCF receives the originating call session request from the I-CSCF or AS includes the following steps.

Before the AS initiates an originating call on behalf of a user, the AS can obtain the name of the S-CSCF by which the user is served from an HSS through third-party registration or via the Sh interface. If the AS obtains the name of the S-CSCF by which the user is served before the AS initiates the originating call on behalf of a user, Step 2101a is performed, that is, the AS directly routes the session to the S-CSCF by which the user is served. If the name of the S-CSCF by which the user is served cannot be obtained, Step 2101b1 is performed;

In Step 2101b1, the session is routed to the I-CSCF in the home domain of the user.

In Step 2101b2, the I-CSCF initiates an LIR message to the HSS, fills a calling user identity in a P-Asserted-Identity header field of the received message in the LIR, and adds an originating call request flag to query information about a current location of the user, that is, information about the S-CSCF by which the user is served.

In Step 2101b3, the HSS finds that the registration state of the user stored in the HSS is registered.

In Step 2101b4, the HSS stores the name of the S-CSCF serving the user, then returns the name of the S-CSCF by which the user is served to the I-CSCF through the LIA.

In Step 2101b5, the I-CSCF routes an INVITE message to the S-CSCF returned by the HSS.

In Step 2102, because the S-CSCF does not have data of the user, the S-CSCF carries in an SAR the user identity as in the P-Asserted-Identity header field of the message, so as to request subscription data of the user from the HSS; a Server Assignment Type parameter in the SAR command is set to UNREGISTERED_USER; and in specific implementation, the S-CSCF may carry an error identifier thereof in the SAR sent to the HSS.

In Step 2103, if the HSS finds that a state of IMPU in the SAR request stored in the HSS is registered, and the S-CSCF initiating the SAR operation and an S-CSCF recorded in the HSS are the same, the HSS downloads the user data to the S-CSCF through an SAA.

At this time, when the S-CSCF carries the error identifier in the SAR, the HSS may download the user data to the S-CSCF through the SAA.

In Step 2104, the S-CSCF performs the service control.

In Step 2105, the S-CSCF carries out subsequent processing.

It can be seen from the above two embodiments that, when the HSS receives the SAR command sent by the S-CSCF to request the user data, if the S-CSCF initiating the SAR operation and the S-CSCF stored in the HSS are the same, and the state of the IMPU of the user requesting the operation stored in the HSS is registered, but the Server Assignment Type parameter in the SAR is UNREGISTERED_USER, the HSS downloads the service data of the user to the S-CSCF through the SAA. The HSS may determine whether the IMPU in the SAR subscribes to an unregistered service or not at first. If the IMPU subscribes to an unregistered service, the HSS downloads the service data of the user to the S-CSCF through the SAA. In specific implementation, if it is determined that the SAR of the S-CSCF carries the error identifier at this time, the HSS may download the user data to the S-CSCF through the SAA, and the S-CSCF provides corresponding services to the user.

Figure 22:
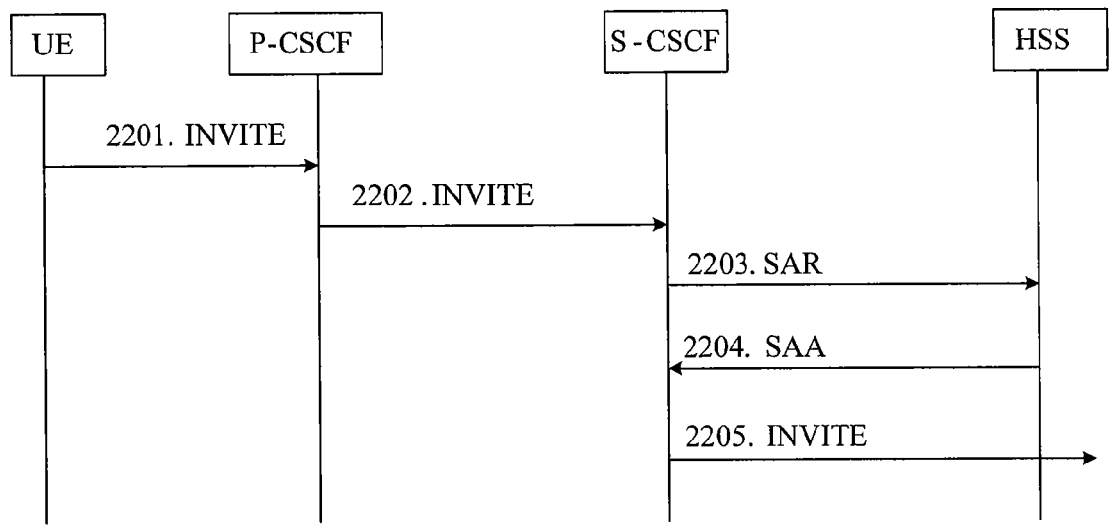
FIG. 22 is a schematic view of the implementing process that an S-CSCF receives a session request from a P-CSCF and processes as a registered user after system breakdown and reboot in a method for service processing after data of a network element is invalid according to the present invention.

FIG. 22 is a schematic view of the implementing process that an S-CSCF receives a session request from a P-CSCF and processes as a registered user after system breakdown and reboot in a method for service processing after data of a network element is invalid according to the present invention. In this embodiment, the implementing process for returning user data when the user data is lost because of system breakdown and reboot is described. As shown in FIG. 22, the process that the S-CSCF receives the session request from the P-CSCF and processes as for a registered user includes the following steps.

In Step 2201, an UE initiates an INVITE message, and may optionally fill a Public User Identity identifying the UE in a P-Preferred-Identity header field.

In Step 2202, after receiving the INVITE message, the P-CSCF checks whether the message contains the P-Preferred-Identity header field, and checks whether the value of the header field matches a registered Public User Identity recorded in the P-CSCF; if the value of the header field matches a registered Public User Identity recorded in the P-CSCF, the P-CSCF uses the Public User Identity as the initiator of the session, and fills the Public User Identity in P-Asserted-Identity; if no matching registered Public User Identity is found, or the P-Preferred-Identity header field does not exist, the P-CSCF selects a default Public User Identity as the initiator of the session for the user, and fills the Public User Identity in the P-Asserted-Identity.

In Step 2203, after receiving the INVITE message, if the S-CSCF finds no information of the user as identified in P-Asserted-Identity, the S-CSCF carries in an SAR the user identity as in the P-Asserted-Identity header field of the message, so as to request subscription data of the user from the HSS; a Server Assignment Type parameter in the SAR command is set to NO_ASSIGNMENT; in specific implementation, the S-CSCF may carry an error identifier thereof in the SAR sent to the HSS.

In Step 2204, if the HSS finds that the S-CSCF initiating the SAR operation and the S-CSCF stored in the HSS are the same, the HSS downloads the user data to the S-CSCF through an SAA; or, if the HSS finds that the error identifier is carried, the HSS downloads the user data to the S-CSCF through the SAA.

In Step 2205, the S-CSCF triggers corresponding services according to the user data downloaded in the SAA, and routes subsequent sessions according to Request-URI (that is, the called) in the INVITE message.

It can be seen from the above embodiment that when the S-CSCF receives an originating call request INVITE message and finds no information of the user, combining error information prompted by the system thereof, the S-CSCF carries in the SAR the user identity as in the P-Asserted-Identity header field of the message, so as to request subscription data of the user from the HSS; the Server Assignment Type parameter in the SAR command is set to NO_ASSIGNMENT; the S-CSCF may also carry an error identifier thereof in the SAR sent to the HSS, and triggers normal services and routes subsequent sessions after receiving the user data.

Figure 23:
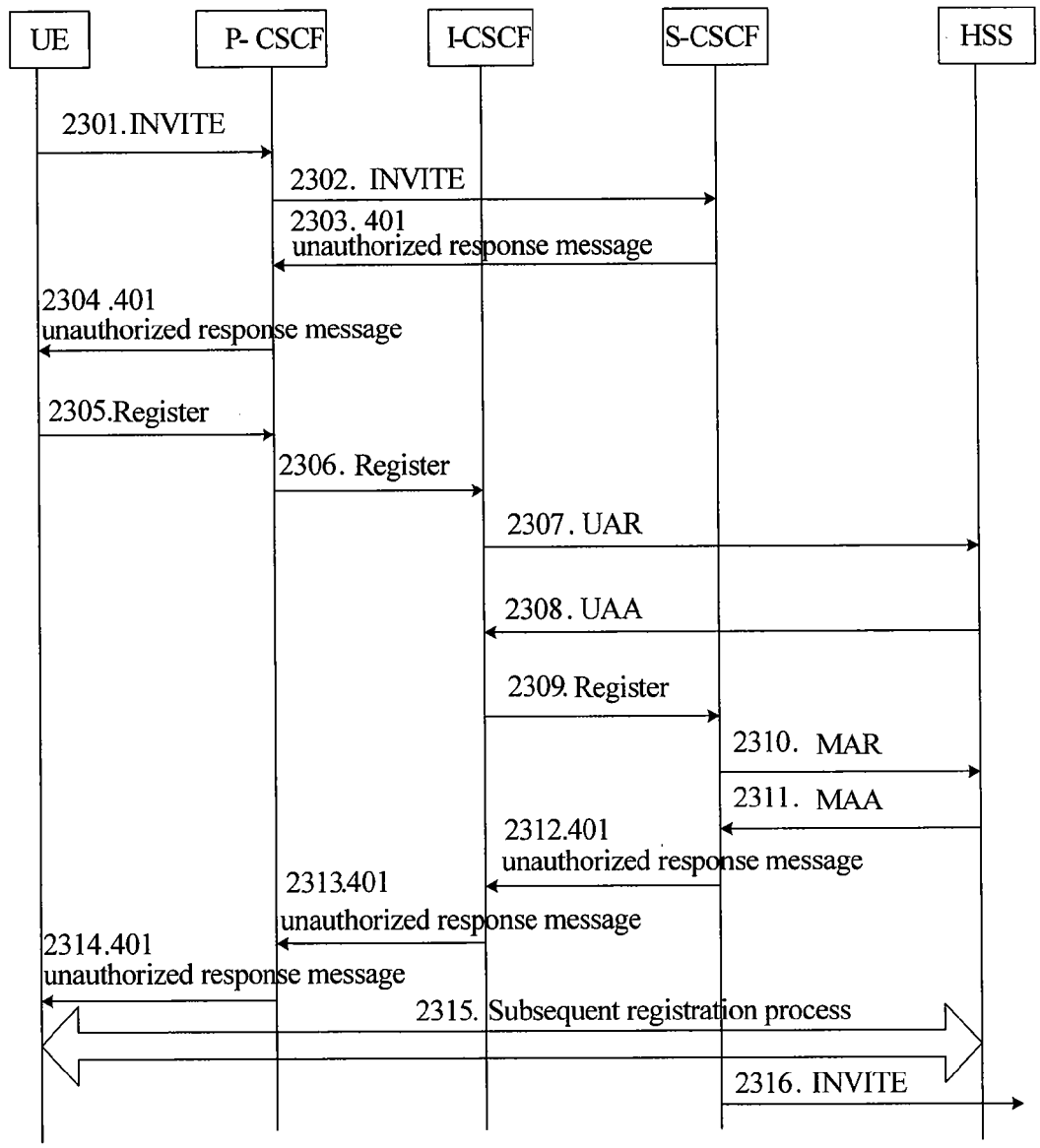
FIG. 23 is a schematic view of the implementing process that an S-CSCF receives a session request from a P-CSCF after system breakdown and reboot in a method for service processing after data of a network element is invalid according to the present invention.

FIG. 23 is a schematic view of the implementing process that an S-CSCF receives a session request from a P-CSCF after system breakdown and reboot in a method for service processing after data of a network element is invalid according to the present invention. In this embodiment, the implementing process for returning user data when the user data is lost because of system breakdown and reboot is described. As shown in FIG. 23, the process that the S-CSCF receives the session request from the P-CSCF and activates re-registration of a UE includes the following steps.

In Step 2301, an UE initiates an INVITE message, and may fill a Public User Identity identifying the UE in a P-Preferred-Identity header field optionally.

In Step 2302, after receiving the INVITE message, the P-CSCF checks whether the message contains the P-Preferred-Identity header field, and checks whether the value of the header field matches a registered Public User Identity recorded in the P-CSCF; if the message contains the P-Preferred-Identity header field and the value of the header field matches a registered Public User Identity recorded in the P-CSCF, the P-CSCF uses the Public User Identity as the initiator of the session, and fills the Public User Identity in P-Asserted-Identity; if no matching registered Public User Identity is found, or the P-Preferred-Identity header field does not exist, the P-CSCF selects a default Public User Identity as the initiator of the session for the user, and fills the Public User Identity in the P-Asserted-Identity.

In Step 2303, after receiving the INVITE message, the S-CSCF does not find information of the user, and returns a 401 response and requests for authentication of the UE.

In Step 2304, the P-CSCF forwards a 401 unauthorized response message to the UE.

In Step 2305, the UE initiates a re-registration request.

In Step 2306, the P-CSCF forwards the re-registration request to the I-CSCF.

In Step 2307, the I-CSCF requests for a name of the S-CSCF assigned to the user or a capability set of S-CSCFs required to serve the user from the HSS through a User-Authorization-Request (UAR).

In Step 2308, the HSS returns the name of the S-CSCF with which the user registers originally to the I-CSCF through a User-Authorization-Answer (UAA).

In Step 2309, the I-CSCF sends a REGISTER message to the S-CSCF.

In Step 2310, after receiving the re-registration request from the UE, the S-CSCF processes the request according to an initial registration process, that is, fills the Public User Identity in the Multimedia-Auth-Request (MAR) with the IMPU in the TO header field of the registration message, and fills the Private User Identity in the Multimedia-Auth-Request (MAR) with the username in the Authorization header field of the registration message, so as to request authentication data of the user from the HSS.

In Step 2311, the HSS obtains corresponding authentication data according to the IMPI of the user in the MAR, and returns the authentication data to the S-CSCF through a Multimedia-Auth-Answer (MAA).

In Step 2312, the S-CSCF sends a 401 unauthorized response message to the UE through the I-CSCF; the response message contains a random challenge (RAND) and a network authentication token (AUTN); meanwhile, an encryption key and an integrity key are sent to the P-CSCF, so as to establish a security association between the P-CSCF and the UE for protecting the integrity in subsequent signaling exchange.

In Step 2313, the I-CSCF sends the 401 unauthorized response message to the P-CSCF.

In Step 2314, the P-CSCF sends the 401 unauthorized response message to the UE.

In Step 2315, the UE carries out the subsequent registration process.

In Step 2316, the S-CSCF triggers corresponding services according to the user data obtained from the HSS in the registration process, and routes subsequent sessions according to Request-URI (that is, the called) in the INVITE message.

It can be seen from the above embodiment that after receiving the originating call request INVITE message, if the S-CSCF does not find information of the user, the S-CSCF may return the 401 unauthorized response message or other error messages to request for the authentication of the UE. Thus, the S-CSCF can trigger the UE to perform re-registration and authentication, so as to recover the user data, trigger normal services, and routes the subsequent sessions.

In other embodiments, the present invention further provides a system for returning user data, an HSS, and an S-CSCF. The implementation of the devices is described in detail in the following with reference to the accompanying drawings.

Figure 24:
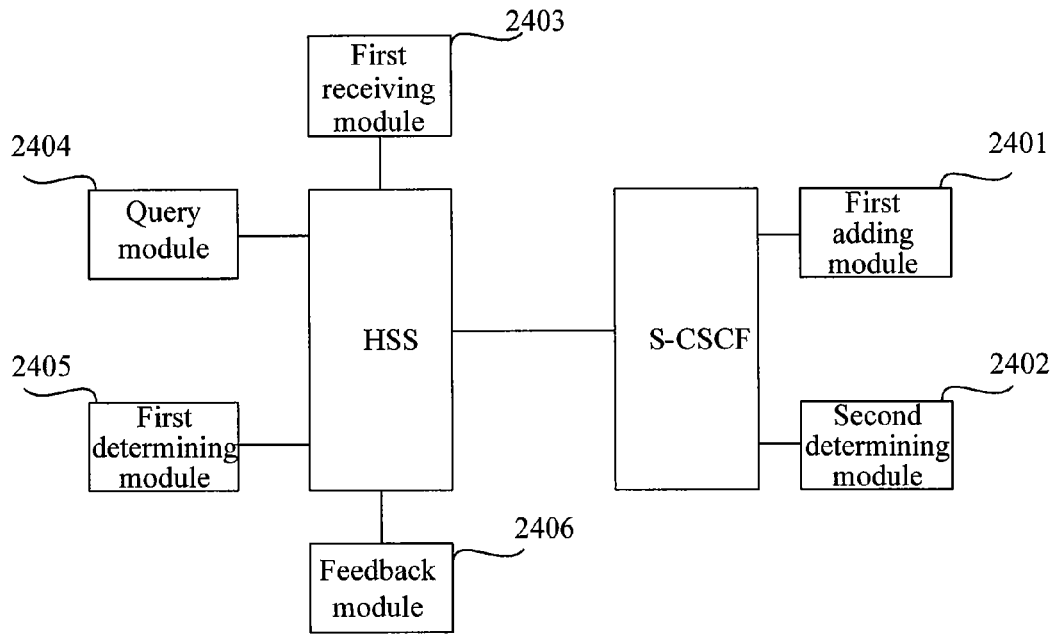
FIG. 24 is a schematic structural view of a system for returning user data in a system for service processing after data of a network element is invalid according to a first embodiment according to the present invention.

FIG. 24 is a schematic structural view of a system for returning user data in a system for service processing after data of a network element is invalid according to a first embodiment of the present invention. As shown in FIG. 24, the system includes an S-CSCF, an HSS, and further includes a first receiving module 2403, a query module 2404, a first determining module 2405, and a feedback module 2406.

The first receiving module 2403 is configured to receive a user data request message sent to the HSS by the S-CSCF, in which the request message contains a user identity.

The query module 2404 is configured to query an S-CSCF assigned to a user according to the user identity.

The first determining module 2405 is configured to determine whether the S-CSCF assigned to the user and obtained by the query module is the requesting S-CSCF, and trigger the feedback module when the assigned S-CSCF is the requesting S-CSCF.

The feedback module 2406 is configured to return the user data according to the request message.

In a preferred embodiment, the query module queries the stored registration state of the user according to the user identity; the first determining module determines whether the stored registration state of the user is registered, and if the stored registration state of the user is registered and the assigned the S-CSCF is the requesting S-CSCF, the first determining module triggers the feedback module to return the user data according to the request message.

The system may further include a first adding module 2401, which is configured to add the user identity to the user data request message after receiving the call request message containing the user identity.

Then, the S-CSCF sends the user data request message containing the added user identity to the HSS.

The system may further include a second determining module 2402, which is configured to determine whether the S-CSCF can find the user data according to the user identity, trigger the first adding module to add the user identity to the user data request message when the user data cannot be found according to the user identity, and send the user data request message to the HSS.

Figure 25:
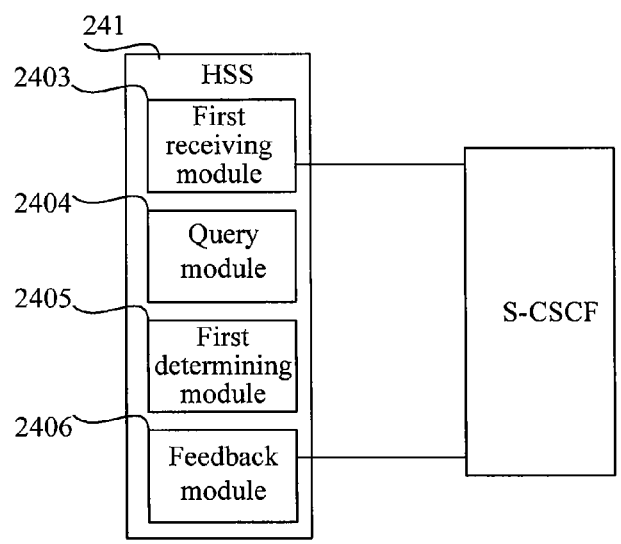
FIG. 25 is a schematic structural view of an HSS in a system for returning user data in a system for service processing after data of a network element is invalid according to the present invention.

FIG. 25 is a schematic structural view of an HSS in a system for returning user data in a system for service processing after data of a network element is invalid according to the present invention. As shown in FIG. 25, the HSS 241 includes a first receiving module 2403, a query module 2404, a first determining module 2405, and a feedback module 2406.

The first receiving module 2403 is configured to receive a user data request message sent by an S-CSCF, in which the request message contains a user identity.

The query module 2404 is configured to query an S-CSCF assigned to a user according to the user identity.

The first determining module 2405 is configured to determine whether the S-CSCF assigned to the user and obtained by the query module is the requesting S-CSCF, and trigger the feedback module when the assigned S-CSCF is the requesting S-CSCF.

The feedback module 2406 is configured to return the user data according to the request message.

Figure 26:
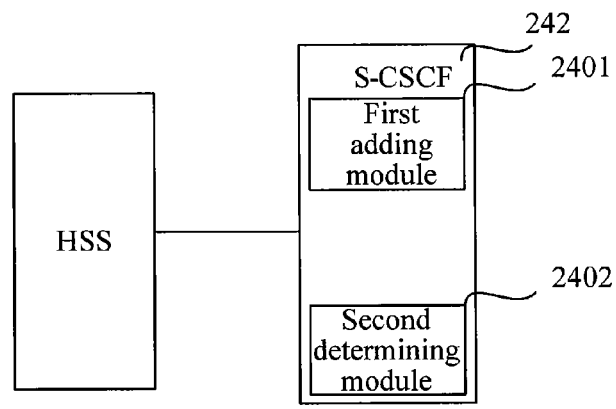
FIG. 26 is a schematic structural view of an S-CSCF in a system for returning user data in a system for service processing after data of a network element is invalid according to the present invention.

FIG. 26 is a schematic structural view of an S-CSCF in a system for returning user data in a system for service processing after data of a network element is invalid according to the present invention. As shown in FIG. 26, the S-SCSF 242 includes a first adding module 2401.

The first adding module 2401 is configured to add a user identity to a user data request message after receiving a call request message containing the user identity. After an HSS queries an S-CSCF assigned to a user according to the user identity, the HSS determines whether the S-CSCF assigned to the user is the requesting S-CSCF, and if the S-CSCF assigned to the user is the requesting S-CSCF, user data is returned according to the request message.

Further more, after querying the stored registration state of the user according to the user identity, the HSS determines whether the stored registration state of the user is registered, and if the stored registration state of the user is registered and the assigned the S-CSCF is the requesting S-CSCF, the HSS returns the user data according to the request message.

The S-CSCF may further include a second determining module 2402, which is configured to determine whether the S-CSCF can find the user data according to the user identity, trigger the first adding module to add the user identity to the user data request message when the user data cannot be found according to the user identity, and send the user data request message to the HSS.

Figure 27:
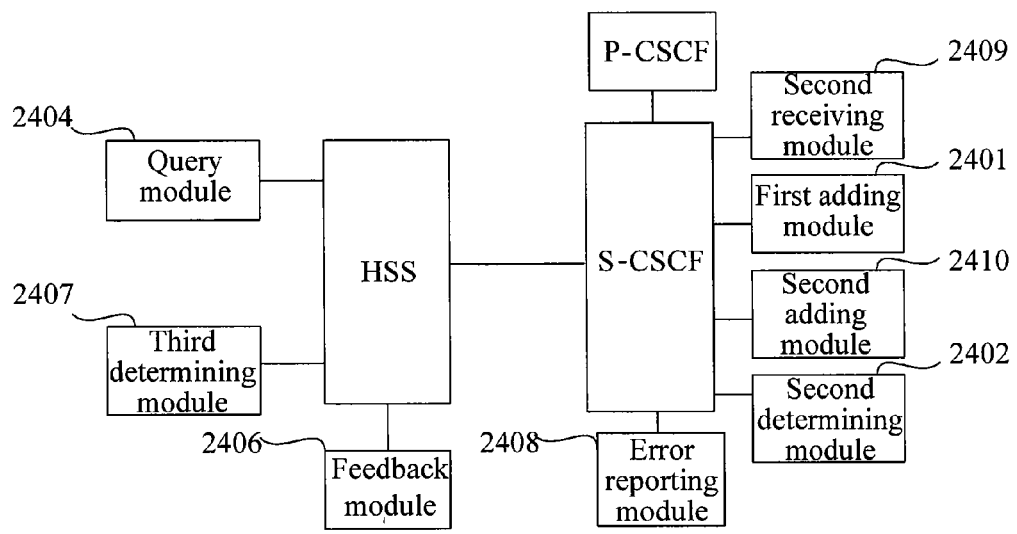
FIG. 27 is a schematic structural view of a system for returning user data in a system for service processing after data of a network element is invalid according to a second embodiment of the present invention.

FIG. 27 is a schematic structural view of a system for returning user data in a system for service processing after data of a network element is invalid according to a second embodiment of the present invention. As shown in FIG. 27, the system includes an S-CSCF, an HSS, and further includes a second receiving module 2409, an error reporting module 2408, a second determining module 2402, a second adding module 2410, a third determining module 2407, and a feedback module 2406.

The second receiving module 2409 is configured to receive a call request message sent to the S-CSCF, in which the request message contains a user identity.

The error reporting module 2408 is configured to trigger the second determining module after receiving an S-CSCF system error message.

The second determining module 2402 is configured to determine whether the S-CSCF can find user data according to the user identity, and trigger the second adding module when the user data cannot be found according to the user identity.

The second adding module 2410 is configured to add the user identity and an error identifier to a user data request message, and send the user data request message to the HSS.

The third determining module 2407 is configured to determine whether the user data request message contains the error identifier after receiving the user data request message sent to the HSS, and trigger the feedback module when the error identifier is contained.

The feedback module 2406 is configured to return the user data according to the request message.

In a preferred embodiment, the query module 2404 is configured to query the stored registration state of the user according to the user identity.

The third determining module 2407 is further configured to trigger the feedback module to return the user data according to the request message after it is determined that the request message contains the error identifier and the stored registration state of the user is registered.

Figure 28:
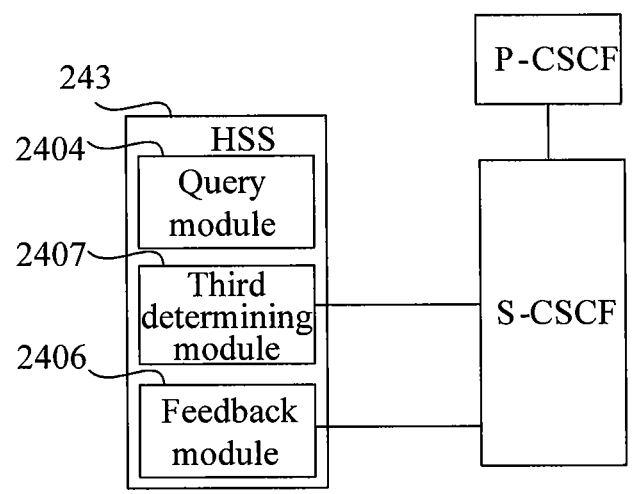
FIG. 28 is a schematic structural view of another HSS in a system for returning user data in a system for service processing after data of a network element is invalid according to the present invention.

FIG. 28 is a schematic structural view of another HSS in a system for returning user data in a system for service processing after data of a network element is invalid according to the present invention. As shown in FIG. 28, the HSS includes a third determining module 2407 and a feedback module 2406.

The third determining module 2407 is configured to determine whether the user data request message contains the error identifier after receiving the user data request message sent to the HSS, and trigger the feedback module when the error identifier is contained.

The feedback module 2406 is configured to return the user data according to the request message.

In a preferred embodiment, the HSS may further include a query module 2404, which is configured to query the stored registration state of the user according to the user identity.

The third determining module 2407 is further configured to trigger the feedback module to return the user data according to the request message after it is determined that the request message contains the error identifier and the stored registration state of the user is registered.

Figure 29:
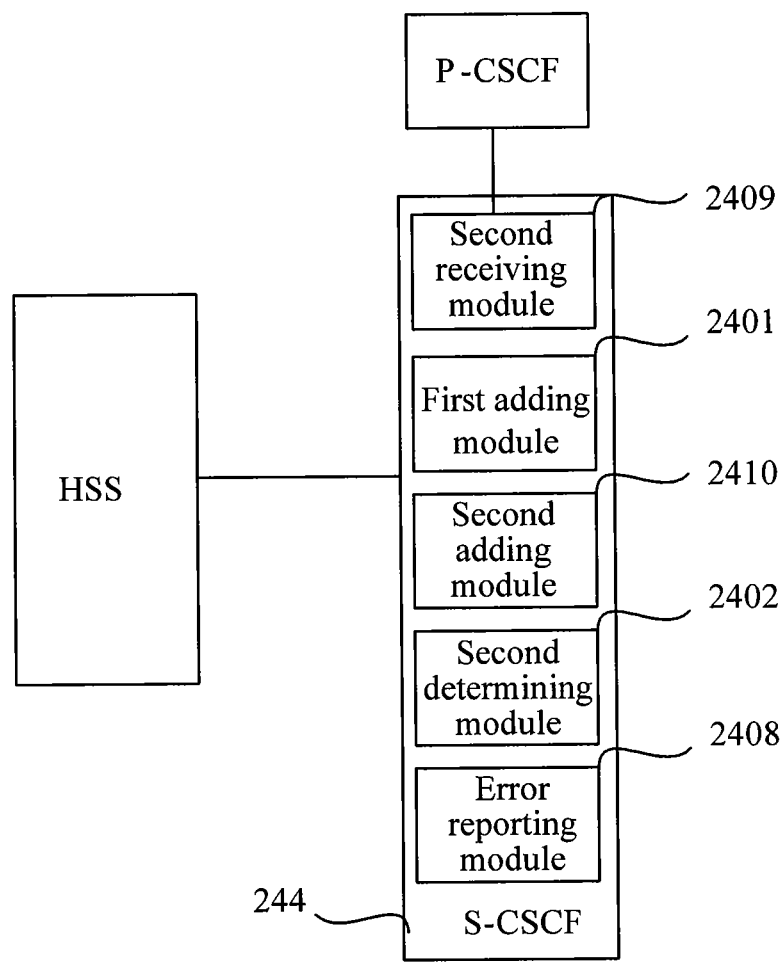
FIG. 29 is a schematic structural view of another S-CSCF in a system for returning user data in a system for service processing after data of a network element is invalid according to the present invention.

FIG. 29 is a schematic structural view of another S-CSCF in a system for returning user data in a system for service processing after data of a network element is invalid according to the present invention. As shown in FIG. 29, the S-CSCF includes a second receiving module 2409, an error reporting module 2408, a second determining module 2402, and a second adding module 2410.

The second receiving module 2409 is configured to receive a call request message sent to the S-CSCF, in which the request message contains a user identity.

The error reporting module 2408 is configured to trigger the second determining module after receiving an S-CSCF system error message.

The second determining module 2402 is configured to determine whether the S-CSCF can find user data according to the user identity, and trigger the second adding module when the user data cannot be found according to the user identity.

The second adding module 2410 is configured to add the user identity and an error identifier to a user data request message, and send the user data request message to an HSS; the HSS determines whether to return the user data according to the request message according to whether the request message contains the error identifier.

In a preferred embodiment, the HSS queries the stored registration state of the user according to the user identity, and when the error identifier is contained, and the stored registration state of the user is registered, the HSS returns the user data according to the request message.

It can be seen from the above embodiments that, the embodiments of the present invention enhance the functions of the HSS and the S-CSCF, improve the disaster tolerance of the HSS and S-CSCF; in the case that the user data is lost because of error of the S-CSCF, if an INVITE session request of the IMPU originally registered on the S-CSCF sent by the I-CSCF or the AS is received after the reboot, when the S-CSCF requests user data from the HSS, the HSS does not directly return an error to the S-CSCF, but directly downloads the service data of the user to the S-CSCF through the SAA when finding that the requesting S-CSCF and the assigned S-CSCF are the same or the error identifier is carried. Meanwhile, when the user data is lost because of the error of the S-CSCF, if the INVITE session request of the IMPU originally registered on the S-CSCF sent by the P-CSCF is received after the reboot, the S-CSCF sends the SAR to request the user data from the HSS, and triggers the services and connects the session instead of directly returning a failure response to the P-CSCF. Thus, in the case that the S-CSCF has an error such as system breakdown and is rebooted, the unregistered terminating call, or the originating call initiated by the UE, or the originating call initiated by the AS on behalf of the user can still be provided.

Through the embodiments of the present invention, when the S-CSCF in the network has an error such as system breakdown and is rebooted, the unregistered terminating call, or the originating call initiated by the UE, or the originating call initiated by the AS on behalf of the user can still be provided to the user, so unfavorable service experience of the user is avoided.

Finally, it should be noted that the above embodiments are used only to describe the technical solutions of the present invention, but are not intended to limit the present invention. The present invention is illustrated in detail with reference to the embodiments. However, persons of ordinary skill in the art should understand that modifications can be made to the technical solutions of the above embodiments, and equivalent replacement can be made to some of the technical features; such modifications or replacement does not make the essence of the technical solutions depart from the spirit and scope of the technical solutions of the embodiments of the present invention.

What is claimed is:

1. A method for service processing, comprising:
    receiving, by a proxy call session control function (P-CSCF), a first session initiation protocol (SIP) INVITE message requesting a service from a user equipment (UE), wherein a registration status of the UE in an IP multimedia subsystem is "registered";
    generating, by the P-CSCF, an error response including information for triggering the UE to perform an initial registration when the P-CSCF is unable to contact a first serving call session control function (S-CSCF);
    sending, by the P-CSCF, the error response to the UE;
    receiving, by the P-CSCF, from the UE a second SIP INVITE message requesting the same service as the first SIP INVITE message after the UE performed the initial registration; and
    sending, by the P-CSCF, the second SIP INVITE message to a second S-CSCF.

2. The method according to claim 1, comprising:
    sending, by the P-CSCF, the first SIP INVITE message to the first S-CSCF;
    returning, by the P-CSCF, the error response to the UE when the P-CSCF does not receive a response message responding to the first SIP INVITE message from the first S-CSCF.

3. The method according to claim 2, comprising:
    returning, by the P-CSCF, the error response to the UE when the first S-CSCF is failure; or
    returning, by the P-CSCF, the error response to the UE when a communication link between the P-CSCF and the first S-CSCF is failure.

4. The method according to claim 3, wherein the error response is a 504 (Server Time-out) message.

* * * * *